US008050801B2

(12) United States Patent
Richards et al.

(10) Patent No.: US 8,050,801 B2
(45) Date of Patent: Nov. 1, 2011

(54) DYNAMICALLY EXTENSIBLE AND AUTOMATICALLY CONFIGURABLE BUILDING AUTOMATION SYSTEM AND ARCHITECTURE

(75) Inventors: David M. Richards, Andover, MN (US); Sean M. McCoy, Maple Grove, MN (US)

(73) Assignee: Trane International Inc., New York, NY (US)

(*) Notice: Subject to any disclaimer, the term of this patent is extended or adjusted under 35 U.S.C. 154(b) by 161 days.

(21) Appl. No.: 11/208,773

(22) Filed: Aug. 22, 2005

(65) Prior Publication Data

US 2007/0043476 A1    Feb. 22, 2007

(51) Int. Cl.
*G05B 11/01* (2006.01)
*G05B 15/00* (2006.01)
*G06F 15/16* (2006.01)
*G06F 15/177* (2006.01)
*H04B 7/00* (2006.01)
*H04L 12/28* (2006.01)

(52) U.S. Cl. ............ 700/276; 700/19; 700/20; 370/254; 370/310; 709/200; 709/220; 709/227; 709/230

(58) Field of Classification Search .................... 700/19, 700/20, 276; 709/220, 224, 230, 200, 227; 370/220, 224, 230, 254, 310
See application file for complete search history.

(56) References Cited

U.S. PATENT DOCUMENTS

| 5,311,451 A | 5/1994 | Barrett |
| 5,321,603 A | 6/1994 | Schwenke |
| 5,384,697 A | 1/1995 | Pascucci |
| 5,444,851 A | 8/1995 | Woest |
| 5,463,735 A | 10/1995 | Pascucci et al. |
| 5,511,188 A | 4/1996 | Pascucci et al. |
| 5,522,044 A | 5/1996 | Pascucci et al. |
| 5,550,980 A | 8/1996 | Pascucci et al. |
| 5,559,955 A | 9/1996 | Dev et al. |
| 5,598,566 A | 1/1997 | Pascucci et al. |
| 5,761,432 A | 6/1998 | Bergholm et al. |
| 5,805,442 A | 9/1998 | Crater et al. |
| 5,884,072 A | 3/1999 | Rasmussen |
| 5,982,362 A | 11/1999 | Crater et al. |
| 5,999,179 A | 12/1999 | Kekic et al. |
| 6,028,998 A | 2/2000 | Gloudeman et al. |
| 6,067,477 A | 5/2000 | Wewalaarachchi et al. |

(Continued)

OTHER PUBLICATIONS http://www.nettedautomation.com/glossary_menue/glossary_r.html.*

(Continued)

*Primary Examiner* — Albert Decady
*Assistant Examiner* — Jennifer Norton
(74) *Attorney, Agent, or Firm* — Patterson Thuente IP

(57) ABSTRACT

A building automation system (BAS) architecture is disclosed. The BAS comprises, in one embodiment, an architecture comprising a communication network and having a dynamic extensibility capability and an automatic configuration capability; an engine communicatively coupled to the communication network; and at least one control device communicatively coupled to the communication network, the control device being known or unknown to the engine. The engine can be adapted to selectively implement the dynamic extensibility capability to establish communications with and to control both known and unknown control devices. The engine can be further adapted to selectively implement the automatic configuration capability to determine at least one characteristic of both known and unknown control devices. A method of adding a control device to a building automation system (BAS) by dynamically extending and automatically configuring an architecture of the BAS is also disclosed.

27 Claims, 14 Drawing Sheets

U.S. PATENT DOCUMENTS

| | | | |
|---|---|---|---|
| 6,098,116 A * | 8/2000 | Nixon et al. | 710/8 |
| 6,104,963 A | 8/2000 | Cebasek et al. | |
| 6,115,713 A | 9/2000 | Pascucci et al. | |
| 6,119,125 A | 9/2000 | Gloudeman et al. | |
| 6,141,595 A | 10/2000 | Gloudeman et al. | |
| 6,145,751 A | 11/2000 | Ahmed | |
| 6,148,355 A | 11/2000 | Mahalingam | |
| 6,154,681 A | 11/2000 | Drees et al. | |
| 6,157,943 A | 12/2000 | Meyer | |
| 6,167,316 A | 12/2000 | Gloudeman et al. | |
| 6,240,326 B1 | 5/2001 | Gloudeman et al. | |
| 6,241,156 B1 | 6/2001 | Kline et al. | |
| 6,263,387 B1 * | 7/2001 | Chrabaszcz | 710/302 |
| 6,266,726 B1 * | 7/2001 | Nixon et al. | 710/105 |
| 6,334,107 B1 | 12/2001 | Gale et al. | |
| 6,353,853 B1 | 3/2002 | Gravlin | |
| 6,389,331 B1 | 5/2002 | Jensen et al. | |
| 6,405,103 B1 | 6/2002 | Ryan et al. | |
| 6,487,457 B1 | 11/2002 | Hull et al. | |
| 6,496,893 B1 * | 12/2002 | Arai | 710/302 |
| 6,580,950 B1 | 6/2003 | Johnson et al. | |
| 6,584,095 B1 | 6/2003 | Jacobi et al. | |
| 6,584,096 B1 * | 6/2003 | Allan | 370/352 |
| 6,598,056 B1 | 7/2003 | Hull et al. | |
| 6,636,893 B1 | 10/2003 | Fong | |
| 6,708,505 B2 | 3/2004 | Nakamura et al. | |
| 6,714,977 B1 | 3/2004 | Fowler et al. | |
| 6,832,120 B1 | 12/2004 | Frank et al. | |
| 6,834,298 B1 | 12/2004 | Singer et al. | |
| 6,925,571 B1 | 8/2005 | Motoyama | |
| 6,999,824 B2 | 2/2006 | Glanzer et al. | |
| 7,010,796 B1 | 3/2006 | Strom et al. | |
| 7,065,769 B1 | 6/2006 | Tolopka | |
| 7,080,142 B2 | 7/2006 | Galloway et al. | |
| 7,136,914 B2 | 11/2006 | Motoyama | |
| 7,165,109 B2 * | 1/2007 | Chiloyan et al. | 709/227 |
| 7,194,537 B2 | 3/2007 | Motoyama | |
| 7,206,791 B2 | 4/2007 | Hind et al. | |
| 7,240,106 B2 * | 7/2007 | Cochran et al. | 709/222 |
| 7,246,162 B2 * | 7/2007 | Tindal | 709/223 |
| 7,249,170 B2 * | 7/2007 | Tindal et al. | 709/223 |
| 7,250,856 B2 | 7/2007 | Havekost et al. | |
| 7,251,534 B2 * | 7/2007 | Walls et al. | 700/17 |
| 7,275,079 B2 | 9/2007 | Brodsky et al. | |
| 7,287,085 B1 | 10/2007 | Motoyama | |
| 7,287,257 B2 * | 10/2007 | Meza | 719/321 |
| 7,289,995 B2 | 10/2007 | Motoyama et al. | |
| 7,293,253 B1 | 11/2007 | Soukup | |
| 7,296,079 B2 | 11/2007 | Motoyama | |
| 7,302,469 B2 | 11/2007 | Motoyama | |
| 7,320,023 B2 | 1/2008 | Chintalapati | |
| 7,337,242 B1 | 2/2008 | Motoyama | |
| 7,349,761 B1 | 3/2008 | Cruse | |
| 7,392,310 B2 | 6/2008 | Motoyama | |
| 7,421,474 B2 | 9/2008 | Motoyama | |
| 7,433,740 B2 | 10/2008 | Hesse et al. | |
| 7,437,452 B2 | 10/2008 | Motoyama | |
| 7,437,596 B2 | 10/2008 | McFarland | |
| 7,447,766 B2 | 11/2008 | Motoyama | |
| 7,500,003 B2 | 3/2009 | Motoyama | |
| 7,502,848 B2 | 3/2009 | Motoyama | |
| 7,506,048 B1 | 3/2009 | Motoyama | |
| 7,512,450 B2 | 3/2009 | Ahmed | |
| 7,519,698 B2 | 4/2009 | Motoyama | |
| 7,533,167 B2 | 5/2009 | Motoyama | |
| 7,533,333 B2 | 5/2009 | Motoyama | |
| 7,536,450 B2 | 5/2009 | Motoyama | |
| 7,574,503 B2 | 8/2009 | Motoyama | |
| 7,606,894 B2 | 10/2009 | Motoyama | |
| 7,610,372 B2 | 10/2009 | Motoyama | |
| 7,610,374 B2 | 10/2009 | Motoyama | |
| 7,634,555 B1 | 12/2009 | Wainscott, Jr. et al. | |
| 7,647,397 B2 | 1/2010 | Motoyama | |
| 7,765,826 B2 | 8/2010 | Nichols | |
| 7,870,090 B2 * | 1/2011 | McCoy et al. | 1/1 |
| 7,917,232 B2 * | 3/2011 | McCoy et al. | 700/17 |
| 2002/0016639 A1 | 2/2002 | Smith et al. | |
| 2002/0029096 A1 * | 3/2002 | Takai et al. | 700/276 |
| 2002/0042845 A1 | 4/2002 | Burmann et al. | |
| 2002/0136203 A1 | 9/2002 | Liva et al. | |
| 2002/0152028 A1 | 10/2002 | Motoyama | |
| 2002/0152292 A1 | 10/2002 | Motoyama | |
| 2003/0084176 A1 | 5/2003 | Tewari et al. | |
| 2003/0135765 A1 | 7/2003 | Hind et al. | |
| 2003/0158975 A1 | 8/2003 | Frank et al. | |
| 2003/0159129 A1 | 8/2003 | Frank et al. | |
| 2003/0167323 A1 | 9/2003 | Motoyama | |
| 2004/0059808 A1 * | 3/2004 | Galloway et al. | 709/224 |
| 2004/0075549 A1 * | 4/2004 | Haller | 340/522 |
| 2004/0143510 A1 | 7/2004 | Haeberle et al. | |
| 2004/0148288 A1 | 7/2004 | Haeberle et al. | |
| 2004/0215694 A1 | 10/2004 | Podolsky | |
| 2004/0215740 A1 | 10/2004 | Frank et al. | |
| 2004/0230323 A1 | 11/2004 | Glanzer et al. | |
| 2004/0243988 A1 | 12/2004 | Ota | |
| 2004/0249913 A1 * | 12/2004 | Kaufman, Jr. | 709/223 |
| 2004/0254915 A1 | 12/2004 | Motoyama | |
| 2004/0255023 A1 | 12/2004 | Motoyama | |
| 2005/0071483 A1 | 3/2005 | Motoyama | |
| 2005/0090915 A1 | 4/2005 | Geiwitz | |
| 2005/0177642 A1 | 8/2005 | Motoyama | |
| 2006/0010232 A1 | 1/2006 | Page et al. | |
| 2006/0047787 A1 * | 3/2006 | Agarwal et al. | 709/220 |
| 2006/0058923 A1 | 3/2006 | Kruk et al. | |
| 2006/0130107 A1 | 6/2006 | Gonder et al. | |
| 2006/0155824 A1 | 7/2006 | Motoyama et al. | |
| 2006/0184659 A1 | 8/2006 | Motoyama et al. | |
| 2007/0005736 A1 | 1/2007 | Hansen et al. | |
| 2007/0055698 A1 | 3/2007 | McCoy et al. | |
| 2007/0055756 A1 | 3/2007 | Richards et al. | |
| 2007/0055757 A1 | 3/2007 | Mairs et al. | |
| 2007/0055758 A1 | 3/2007 | McCoy et al. | |
| 2007/0055759 A1 | 3/2007 | McCoy et al. | |
| 2007/0055760 A1 | 3/2007 | McCoy et al. | |
| 2007/0061046 A1 | 3/2007 | Mairs et al. | |
| 2007/0067062 A1 | 3/2007 | Mairs et al. | |
| 2007/0261062 A1 | 11/2007 | Bansal et al. | |
| 2008/0281472 A1 * | 11/2008 | Podgorny et al. | 700/276 |
| 2009/0083416 A1 | 3/2009 | Nass et al. | |
| 2011/0047259 A1 * | 2/2011 | Sato et al. | 709/223 |
| 2011/0047418 A1 * | 2/2011 | Drees et al. | 714/57 |
| 2011/0131336 A1 * | 6/2011 | Wang et al. | 709/228 |

OTHER PUBLICATIONS

"An Efficient Execution Model for Dynamically Reconfigurable Component Software"; Andreas Gal, Peter H. Frohlich, Michael Franz; Department of Information and Computer Science—University of California, Irvine; May 31, 2002; pp. 1-7 http://research.microsoft.com/~cszypers/events/WCOP2002/10_Gal.pdf.*

"BACnet, LonWorks War Continues for BAS Manufacturers", p. 14, Mar. 10, 1997 Issue of Air Conditioning, Heating & Refrigeration News.

"Controls Companies See Opportunities on Internet", Mar. 1, 1997 Issue of Energy User News.

Tracer Summit Web Server, Dated Mar. 2003, Document No. BAS-PRC014-EN.

"Infinity WebServer" brochure, Copyright 1997 by Andover Controls Corporation, Document No. DS-WEBSVR-A.

"Facility Management Unleashed: web.Client", Copyright 2002 by Andover Controls, Document No. BR-WC-A.

"Building Automation Systems on the Internet", by Albert T.P. So, W. L. Chan and W.L. Tse, May/Jun. 1997 Issue of Facilities Magazine, vol. 15, No. 5/6, pp. 125-133.

"Connecting LonWorks and TCP/IP Enterprise Networks—Real Application Successes", by Coactive Aesthetics, dated 1997.

"Remote Building Monitoring and Control", an ACEEE paper, dated Jul. 18, 1996.

"Remote Building Control Using the Internet", by Edward Finch, Dec. 1998 Issue of Facilities Magazine, vol. 15-No. 12/13, pp. 356-360.

"Marketing Tracer Summit", a marketing guide dated Jan. 1998, Order No. BAS-MG-46.

"Tracer Summit Users Network", a marketing guide dated Mar. 2002, Order No. BAS-SLM005-EN.

Marketing the Tracer ZN.511 and ZN.521 Zone Controllers, a marketing guide dated Feb. 2001, Order No. BAS-SLM008-EN.
Microsoft Computer Dictionary, Fifth Edition, "Server" definition, Published: 2002, Publisher: Microsoft Press, p. 474.
International Search Report; PCT Application No. PCT/US06/32141; dated Oct. 2, 2008.
Written Opinion; PCT Application No. PCT/US06/32145; dated Jun. 28, 2008.
International Search Report; PCT Application No. PCT/US06/32145; dated Jul. 2, 2008.
Written Opinion; PCT Application No. PCT/US06/31863; dated Apr. 30, 2009.
File History for U.S. Appl. No. 11/316,410.
File History for U.S. Appl. No. 11/316,695.
File History for U.S. Appl. No. 11/316,702.
File History for U.S. Appl. No. 11/316,698.
File History for U.S. Appl. No. 11/316,703.
File History for U.S. Appl. No. 11/316,697.
File History for U.S. Appl. No. 11/316,687.
File History for U.S. Appl. No. 11/316,699.
personalSCADA 2.0 User's Guide, Eutech Cybernetics Pte Ltd., 2002.
"Tracer Summit, Building Automation System," TRANE, Doc #BAS-PRC001-EN, Aug. 2002.
GB Examination Report dated Aug. 10, 2009, 1 page.
GB Patent Application No. GB0805153.4; filed Aug. 17, 2006; Applicant Trane International, Inc.; GB Examination Report dated Mar. 12, 2010; 2 pages.
GB Patent Application No. GB1002641.7; filed Aug. 17, 2006; Applicant Trane International, Inc.; GB Search Report dated Mar. 12, 2010; 3 pages.
British Application No. GB0805149.2, Examination Report, Applicant Trane International Inc., dated May 18, 2010, 3 pages.
British Application No. GB0805151.8, Examination Report, Applicant Trane International Inc., dated Jun. 8, 2010, 2 pages.
*Enterprise Buildings Integrator R310*, Specification Data, Honeywell, 20 pages, Mar. 2003.
PCT/US2010/023758, filed Feb. 10, 2010, Applicant Trane International, Inc., International Search Report/Written Opinion dated Aug. 19, 2010, 7 pages.
British Application No. GB 0805151.8, filed Aug. 17, 2006, Applicant Trane International Inc., Examination Report dated Jun. 8, 2010, 2 pages.
PCT Patent Application No. PCT/US2006/032141, Applicant American Standard International, Inc., Written Opinion, dated Oct. 2, 2008.
PCT Patent Application No. PCT/US2006/031863, Applicant American Standard International, Inc., Search Report, dated Mar. 19, 2008.

* cited by examiner

DYNAMICALLY EXTENSIBLE AND AUTOMATICALLY CONFIGURABLE BUILDING AUTOMATION SYSTEM AND ARCHITECTURE

FIELD OF THE INVENTION

The present invention relates generally to building automation systems. More particularly, the present invention relates to building automation system architectures, communications, and configurations.

BACKGROUND OF THE INVENTION

Building automation systems (BAS) are used to coordinate, manage, and automate control of diverse environmental, physical, and electrical building subsystems, particularly HVAC and climate control but also including security, lighting, power, and the like. Typical existing BAS systems are hardwired or use a proprietary communication standard or protocol to link the various subsystems and provide system-wide user access and control.

Hardwiring and manual programming of BAS systems can create a robust fixed system customized for a particular installation. These systems, however, often require extensive customization for each building or site. Particular manual programming and other installation elements may not be applicable to other systems, contributing to the costliness and time-consuming installation associated with such systems.

Further, hardwired systems and those using proprietary communication standards and protocols are difficult or impossible to integrate with system components, panels, and other elements from different vendors or generations. For example, a campus of buildings in which an upgraded BAS is being installed may have existing previous generation (legacy) systems and systems from more than one vendor. Installing a BAS and making it compatible with the existing systems in such a situation is time-consuming, requiring extensive manual service and programming to integrate the existing devices and implement the custom BAS.

With the introduction of BACnet™, an ASHRAE (American Society of Heating, Refrigerating and Air-Conditioning Engineers) and ANSI (American National Standards Institute) standard, and LonTalk™, an integration approach developed by Echelon, some uniformity of standards and communications has been achieved in the industry. BACnet™ was intended to standardize HVAC interoperability and serve as a solution to industry-wide issues. In use, however, BACnet™ exists in multiple versions and includes various non-standard feature functions available to vendors. Many vendors dictate a particular BACnet™ version that must be used in order to achieve system compliance, forcing BAS users to update. BACnet™ is therefore not completely interoperable across versions and features.

Additionally, BAS installation and maintenance are still generally labor-intensive custom tasks that vary with each system implementation. Upgrading, expanding, and updating or removing system components and services in particular are also complex tasks, as the existing BAS may or may not support new devices and must be manually reconfigured to recognize and incorporate changes. In a common scenario, a user managing a building site with two control units operating in an existing BAS wants to add a third control unit in a newly constructed wing of the building. The user must upgrade the existing control units to the new version of the third control unit in order for the system to be compliant because the system cannot accommodate multiple versions or integrate the new control unit.

Existing BASs also do not offer the accessibility, customization, and management tools desired by system users. Current BASs are difficult and communicatively cumbersome to manage on a large scale, such as by a regional or nationwide retailer or other organization. Further, while Internet-based and accessible systems are presently available and in use, these systems suffer from several drawbacks. Many current Internet BASs were created as add-ons to existing BASs and thus have integrated and proprietary designs. These systems do not offer the adaptability and extensibility necessary to interface with non-native systems and sub-systems, a particular issue with respect to large-scale systems implemented in existing structures. Existing system also do not provide higher-level extensibility, configurability, and customization tools. The Internet therefore presents a unique platform for which an advanced BAS could be designed, implemented, and managed.

Accordingly, a need remains for an intelligent BAS having a flexible and dynamic architecture and providing increased communication, management, and control options, particularly from a user perspective.

SUMMARY OF THE INVENTION

The present invention substantially addresses the above-identified needs by providing a dynamically extendible and automatically configurable building automation system (BAS). The BAS comprises, in one embodiment, an architecture comprising a communication network and having a dynamic extensibility capability and an automatic configuration capability; an engine communicatively coupled to the communication network; and at least one control device communicatively coupled to the communication network, the control device being known or unknown to the engine.

The engine of the BAS can be adapted to selectively implement the dynamic extensibility capability to establish communications with and to control both known and unknown control devices. The engine can be further adapted to selectively implement the automatic configuration capability to determine at least one characteristic of both known and unknown control devices. The present invention also includes a method of adding a control device to a BAS by dynamically extending and automatically configuring an architecture of the BAS. In one embodiment, the method comprises obtaining a network address of a previously unknown control device at a site. A discovery process is then implemented to establish communications with and obtain metadata from the control device, and the site is synchronized by evaluating at least one characteristic of the metadata and storing the at least one characteristic as a definition in a program of the architecture. A status of the control device is altered from known to unknown, and the architecture is dynamically extended and automatically configured by executing the program without recompilation.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
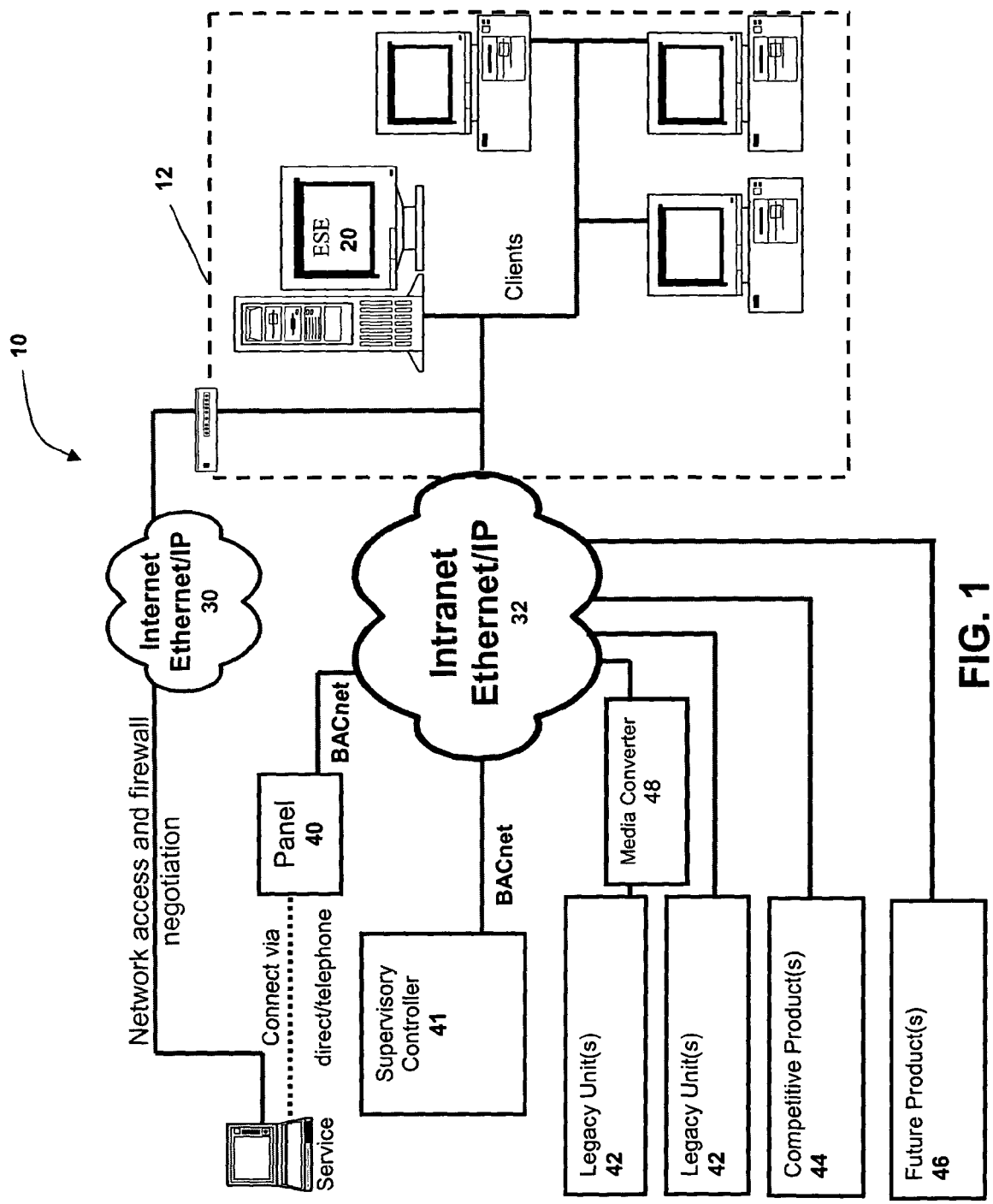
FIG. 1 is a building automation system (BAS) according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The building automation system and architecture of the invention provide an intelligent control system via a dynamically extensible and automatically configurable architecture. The system can be implemented locally or widely, from a space or building level to an enterprise level, encompassing virtually any structure, cluster, campus, and area in between. The invention can be more readily understood by reference to FIGS. 1-11 and the following description. While the invention is not necessarily limited to the specifically depicted application(s), the invention will be better appreciated using a discussion of exemplary embodiments in specific contexts.

A BAS according to one embodiment of the present invention comprises a dynamically extensible and automatically configurable architecture anchored by an enterprise server engine (ESE). The BAS and ESE comprise a versatile and robust control system that operably supports the management of HVAC and other subsystems in a building from a central location.

The BAS is an automatically and intelligently scalable object-oriented system in one embodiment, providing multi-site management capabilities in a local or widely distributed geographic area. The BAS is preferably networked for user accessibility. In one embodiment, the BAS is user-accessible via either or both a computer system on an Intranet or the Internet as a web-enabled application running on a web server. The web and network applications provide operational services for HVAC and other subsystems.

In one embodiment, the BAS is capable of supporting and integrating legacy, current, and next generation components and subsystems. The BAS is further able to support common vendor or manufacturer systems as well as competitor systems by intelligently identifying the systems and/or subsystems and facilitating integration into the dynamically extensible BAS architecture. This flexibility enables the BAS architecture to support added applications and new control panel and subsystem types and versions without recompilation and reissue, and to extend, customize, and tailor the BAS to specific needs in a particular implementation. Further, dynamic extensibility enables a complex system to provide enhanced versatility and usability.

Referring to FIG. 1, a BAS 10 according to one embodiment of the invention comprises an ESE 20 preferably located at a central location 12, such as a headquarters or control station. ESE 20 comprises a single local device in one embodiment. In another embodiment, ESE 20 comprises a multiple server configuration operating in a local or distributed environment. "Central" location 12, as understood by those skilled in the art, is not necessarily a geographic center but rather a communicative or control-based location in one embodiment from which it is convenient or feasible to manage BAS 10. For example, a user may manage one or more BASs at locations nationwide or within a region from a single headquarters location.

ESE 20 is preferably locally networked at location 12 and communicatively coupled to the Internet and/or Intranet 30 and therefore can provide access and management control from virtually any location via a computer system, internal or external to a user's computer system. ESE 20 and BAS 10 need not be web-based or communicatively coupled to the Internet as shown in FIG. 1, as other options known to those skilled in the art exist. The Internet and/or Intranet Ethernet/IP 30 or another local area network (LAN) or wide area network (WAN) facilitate communications between ESE 20 and other system components and devices. Some or all communications and connections may be either wired or wireless within portions of BAS 10 as needed or desired.

Each implementation of system 10 can vary substantially by size, composition of devices, and balance of present, legacy, and future generation devices. System 10 can also vary by vendor/manufacturer, type, physical layout of building and/or campus, user needs, and other characteristics. Therefore, each implementation of system 10 and ESE 20 in particular is done on a site-by-site basis. ESE 20 can recognize, communicate with, and control a variety of system devices, including present generation and common manufacturer, legacy or previous generation, and competitor controllers and building automation panels. System 10, via ESE 20, can also expand to integrate next-generation devices.

As depicted in FIG. 1, for example, a present generation supervisory controller 41, such as a Building Control Unit manufactured by TRANE®, or a panel 40, can be directly communicatively coupled to the Internet 30 and/or Intranet 32, while legacy unit(s) 42 can be directly communicatively coupled to the Internet 30 and/or Intranet 32 or coupled via a media converter 48. Media converter 48 is preferably a simple translator but may also comprise other more sophisticated devices as needed. Media converter 48 is preferably not but may also be used with competitive product(s) 44 and/or future product(s) 46 in various embodiments. Competitive products 44 are also preferably directly coupled to the Internet 30 and/or Intranet 32. ESE 20 is further able to support future product(s) 46, such as updated versions of current controllers, newly developed products, and the like. ESE 20 is also preferably able to coexist and cooperate with other similar but previous generation control and management systems, as will be described in more detail below.

Each product, panel, device, or unit, including panel 40, supervisory controller 41, legacy unit(s) 42, competitive product(s) 44, and future product(s) 46, is modelled as and generally referred to herein throughout as an object in the context of system 10 of the invention. In object-oriented system 10 and ESE 20, efficiencies are achieved by modelling common objects for recognition and application to other similar objects. An object, simply put, is an instance of a class, or an encapsulation of descriptive behaviors and functionality of a group. A general object can then be made specific based upon rules applied to the object. Referring to system 10, an object may encompass virtually any type or piece of equipment, or any input or output point, in system 10, as well as any application or data structure relevant to system 10. System 10 is therefore able to reduce manual programming and integration of new devices by taking an object-oriented approach to system devices and components. System 10 is further able to identify and call attention to objects and object-related events that are not recognized such that manual service and attention can be delivered. These aspects of the invention are described in more detail below.

Figure 2:
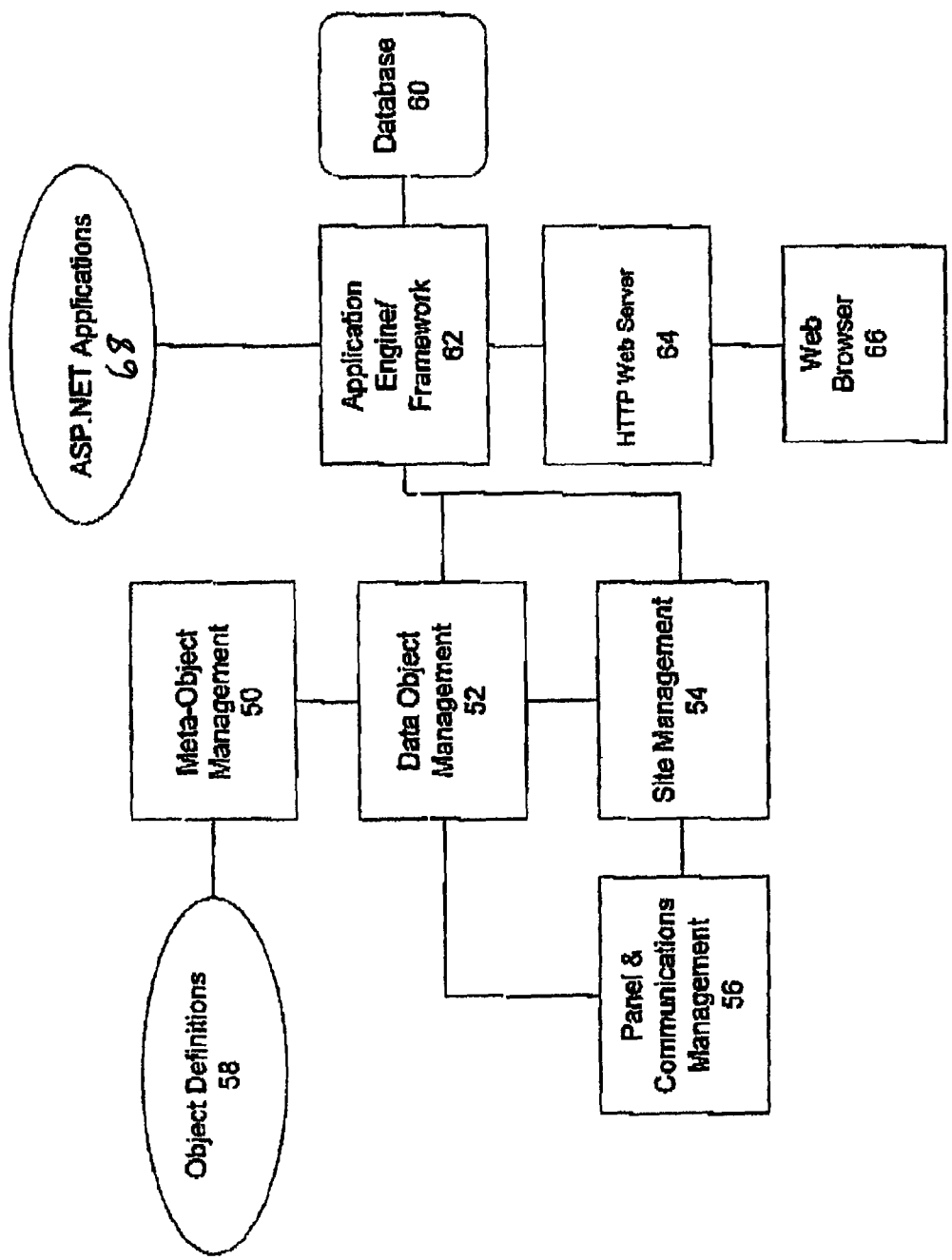
FIG. 2 is an object diagram according to one embodiment of the invention.

FIG. 2 is a diagram of an operating architecture of system 10 according to one embodiment. In dynamically extensible and scalable system 10, objects exist in a hierarchical or class structure. For example, data objects, site objects, and panel objects are interrelated and can be relatively defined, with the objects including or associated with respective object definitions 58, such as type, version, vendor, and the like, that are stored in a database 60 and interpreted by system 10 within an application engine/framework 62 with ESE 20 to determine how the particular object is to be handled by system 10. Internal meta-object management 50, data object management 52, site management 54, and panel and communications management 56 representations interface application engine/framework 62 with external sources and entities to manage objects within system 10. A web server 64 then interfaces system 10 via application engine/framework 62 to an external interface. In one preferred but non-exclusive embodiment, the external interface comprises a graphical user interface (GUI) presented via an Internet 30 or intranet 32 system using a web browser 66. In another embodiment, the external interface comprises ASP.NET applications 68.

Figure 3:
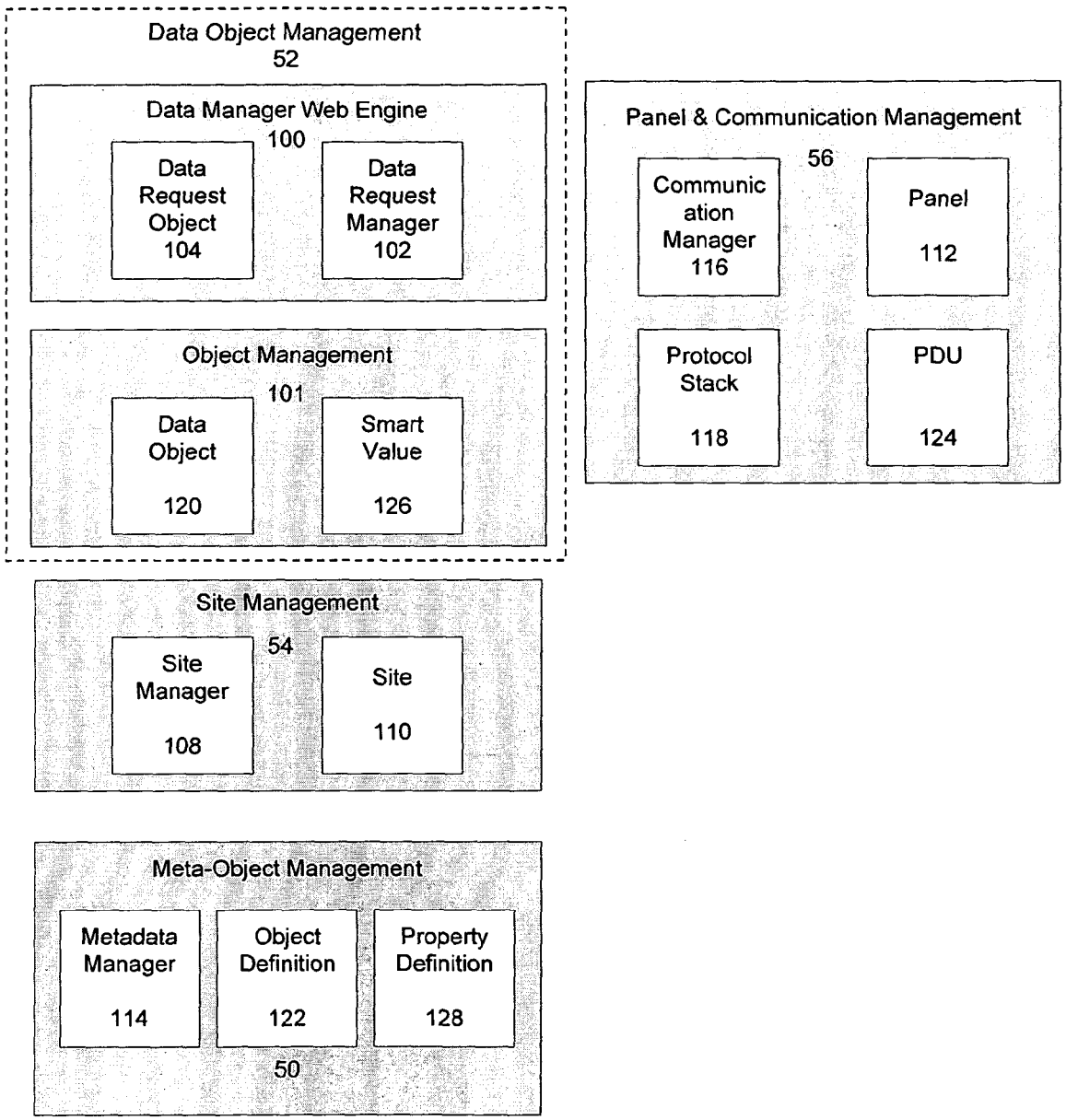
FIG. 3 is an object model diagram according to one embodiment of the invention.

The main objects and classifications used by system 10 in one embodiment are shown in FIG. 3 with reference to FIG. 2. Data object management 52 includes a data manager web engine 100 and object management 101. Data manager web engine 100 includes a data request manager 102 and a data request object 104. Data request manager 102 is an object for managing incoming XML requests, and for creating data request objects 104, associated data objects 120, and the associated URL and identification for outside clients to use as a reference. Data request manager 102 is also a cache for data request object 104 and data object 120 from the user interface and/or any client. Data request object 104 is an object that contains a collection of read requests. Object management 101 includes data object 120 and smart value 126. Data object 120 is an object that encapsulates one or more objects that exist in each panel, including both equipment and application objects. Smart value 126 is an object that encapsulates the properties that exist in the data objects and is responsible for encoding/decoding raw data into and out of any external format and for performing conversions, if needed.

Site management 54 includes a site manager 108 and site 110. Site manager 108 is an object responsible for managing all sites 110, starting, adding, and operations that transcend sites. Site 110 is an object that is central for interacting with a building, which includes at least one individual panel object 112. In one embodiment, a building is seen as a site 110 by ESE 20. A particular site 110, however, can be an individual building or a campus of more than one building. Conversely, a single building can include more than one site 110.

Referring again to FIG. 1, for example, panel 40, supervisory controller 41, legacy unit(s) 42, competitive product(s) 44, and future product(s) 46 together may comprise a single site 110, or some or each of panel 40, supervisory controller 41, legacy unit(s) 42, competitive product(s) 44, and future product(s) 46 may be located at more than one distinct site 110. ESE 20 in system 10 can default to a single building, single site view in one embodiment, which can then be customized or altered according to a user preference or a system characteristic or discovery data. In one particular example, a manufacturing facility includes a first user- and system-defined site 110 consisting of a front office area and a second user- and system-defined site 110 consisting of the manufacturing floor. This plural site definition can make it more convenient and intuitive from a facility perspective to manage disparate spaces.

Meta-object management 50 includes a metadata manager 114, an objection definition 122, and a property definition 128. Metadata manager 114 is an object for parsing in metadata XML files and managing metadata definitions and is preferably cached by panel type, version, and object type in one embodiment. Object definition 122 is a metadata object that defines the properties, services, and behaviours of data object(s) 120. Property definition 128 is a metadata object that defines the attributes and behaviours for the properties of an object.

Panel and communication management 56 includes communication manager 116, panel 112, protocol stack 118 and protocol data unit (PDU) 124. Communication manager 116 is an object responsible for managing all the communication ports, threads, and protocol stacks. Panel object 112 is an object that represents the physical panel(s) and manages the version of metadata to use and services available for the protocol stack. PDU 124 is an object responsible for an encoding/decoding algorithm for the properties over the communication wire.

Figure 4A:
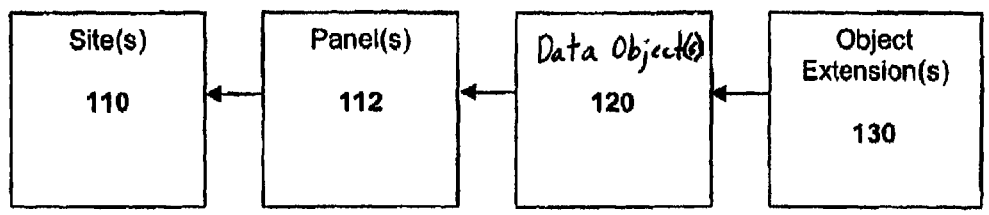
FIG. 4A is a data model block diagram according to one embodiment of the invention.
Figure 4B:
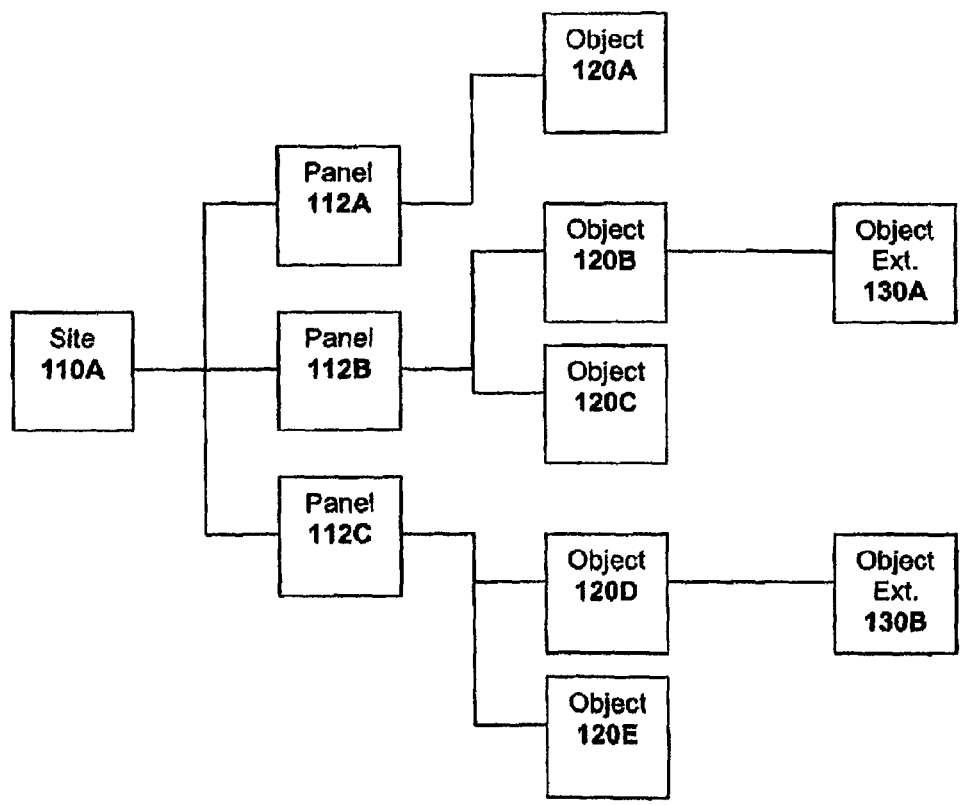
FIG. 4B is a data model block diagram according to one embodiment of the invention.

The main data entities are depicted in FIG. 4A, and an example data model according to one embodiment is depicted in FIG. 4B. At a very basic level, each site 110 is a collection of one or more panels 112 (panel objects), and each panel 112 is a collection of one or more objects, which may need extensions 130 for system operability. Site 110 can be an individual site, i.e., building, or a list of sites managed by ESE 20. Site 110 also includes information for background tasks. Panel(s) 112 is a single panel 112 or a list of panels known for site 110 and the information needed by ESE 20 to manage those particular panels. This information can include panel type, version, vendor, and ignore flags in one embodiment. Object(s) 120 is a list of objects that exist in each panel 112 and is used for navigation, display, and management. Object extension(s) 130 is information kept on ESE 20 that is specific for each object 120 as described by the metadata associated with object 120. Object extensions 130 are used to drive a user interface for determining things such as to which family a specific object belongs when an object is in a different family by the object configuration.

A data model similar to the data model of FIG. 4B exists for each individual site 110 in one embodiment. When ESE 20 discovers site 110 in this example, ESE 20 knows or can learn that that site 110A is a collection of panels 112A, 112B, and 112C. Panel 112A includes object 120A. Panel 112B includes objects 120B and 120C, and panel 112C includes objects 120D and 120E. Objects 120B and 120D require object extensions 130A and 130B, respectively. More or fewer panels 112, objects 120, and/or object extensions 130 can be used in other embodiments, the model of FIG. 4B being only one example.

ESE 20 operably reads and writes data in panels 40 and 41 and units 42, 44, and 46 (referring again generally to system 10 of FIG. 1) that support building automation standard protocols. In the context of FIG. 1 and herein, units 42, 44, and 46 can be panels but are distinguished by type in FIG. 1 to illustrate possible configurations and compositions of system 10. For example, ESE 20 and BAS 10 as a whole are generally compatible with the BACnet™ protocol and/or XML at a minimum, although physical or virtual media converters 48 may also be needed for particular devices in various embodiments. While ESE 20 is compatible with and/or configurable for a wide variety of protocols and standards, particular examples herein will refer to the BACnet™ protocol, Internet 30, and Intranet 32 systems where appropriate, in the context of one non-limiting embodiment of the invention.

ESE 20 is structured, in one embodiment, to integrate various implementations of BACnet™ and other protocols as natively as possible. ESE 20 can operably and concurrently support multiple versions and implementations, e.g., services supported and proprietary information. This enables ESE 20 to integrate both "inside," i.e., common vendor/manufacturer or platform, and "outside," i.e., other vendor or competitor, devices without requiring manual programming of the object. Contrast this with current methods of integration of outside objects 44 in other systems, which require time- and labor-intensive manual programming of the data and relationship by field service technicians unique to each installation, adding to the cost and complexity of these other systems and reducing convenience.

ESE 20 operably provides an interface for system installation, setup, integration, and support. For example, ESE 20 provides an interface for device/object 40, 42, 44, and 46 setup parameters, including IP address, subnet mask, gateway, and name of server for each, where applicable. ESE 20 further provides a methodology and/or utility to setup and customize web pages, which can include both templates and individual pages, and to serve and publish graphics to web pages. System 10 and ESE 20 also allow user definition of attributes for a given site for grouping purposes. In one embodiment, at a minimum, each site 110 is associated with a geographical and a type attribute and a search function is provided to allow users to search for sites or groups of sites. ESE 20 further preferably accommodates the addition, removal, and general management of entire sites 110 within system 10.

Site management of ESE 20 is an important aspect of system 10 from an implementation perspective. Dynamic extensions, enhancements, and changes are intended to be natural, fundamental features of system 10. Further, ESE 20, as a core engine of system 10, is designed to be used as the foundation for other systems and devices, including next-generation developments. Each implementation of ESE 20 and system 10 is designed to keep site and data management services separate from a user interface and applications to ensure that the core engine aspect is not compromised.

Figure 5A:
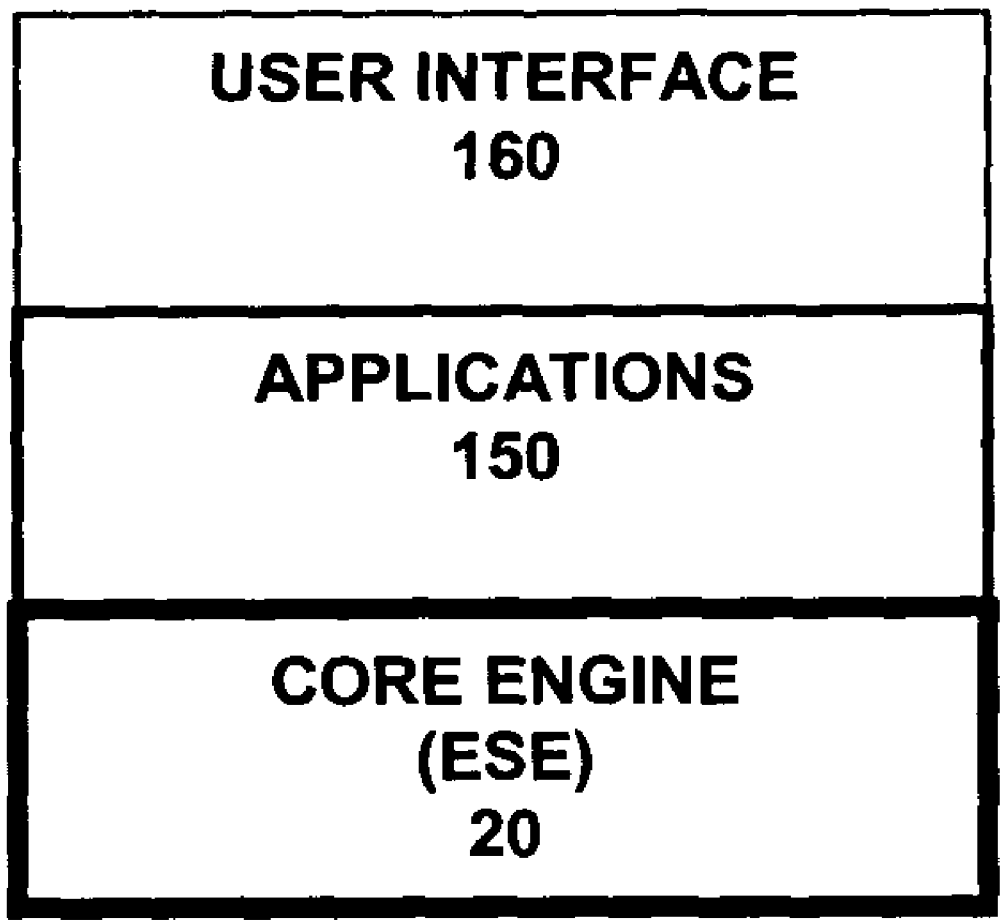
FIG. 5A is a simplified BAS architecture layer block diagram according to one embodiment of the invention.
Figure 5B:
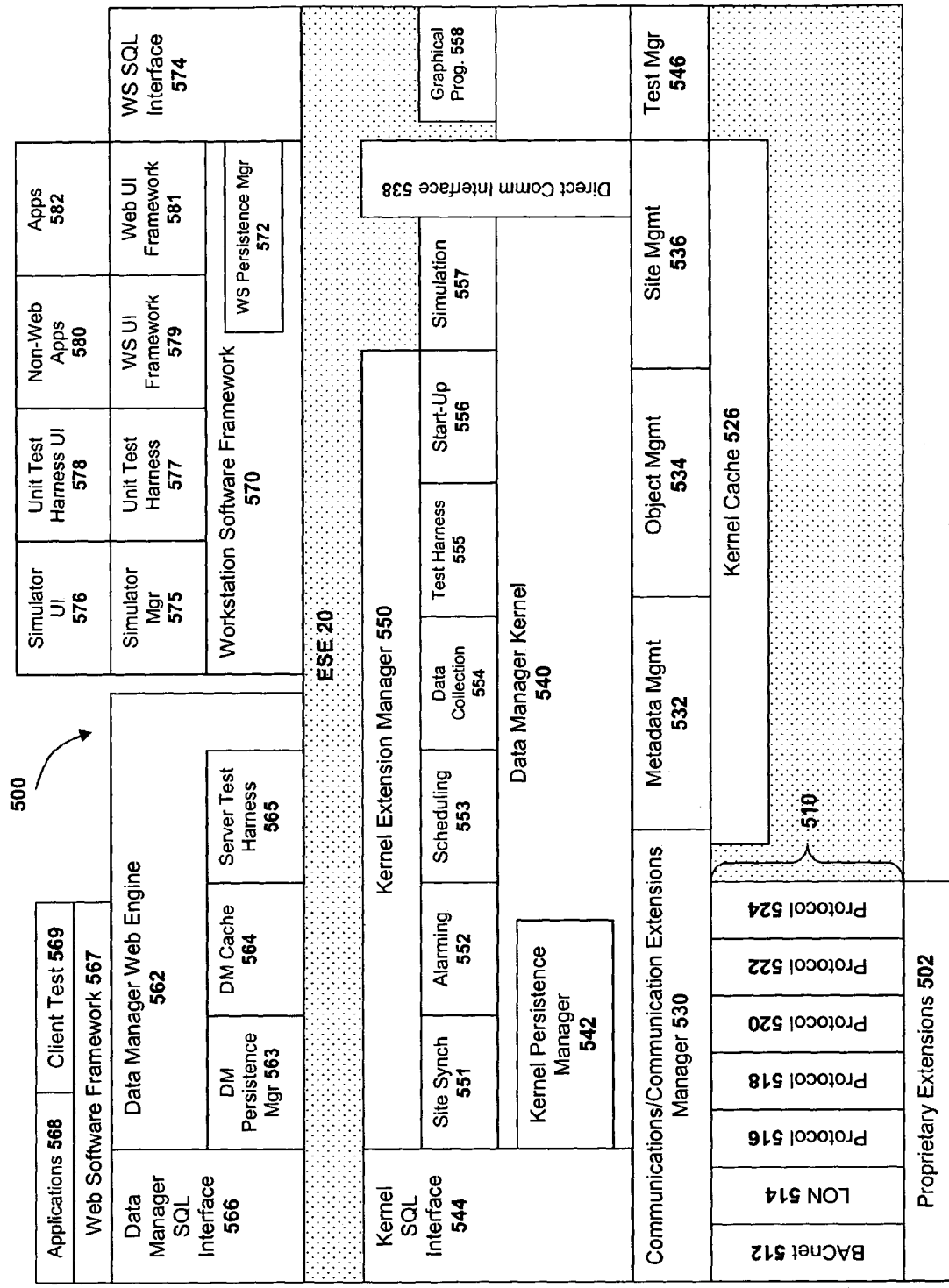
FIG. 5B is a BAS architecture diagram according to one embodiment of the invention.

The core engine, or ESE 20 in the embodiment of FIG. 1, forms a foundation or platform for system 10. Referring to FIGS. 5A and 5B, ESE 20 supports applications 150 and user interface features and functions 160 within system 10. ESE 20 within system architecture 500 further defines and describes the whole of the engine support. A proprietary extensions layer 502 of architecture 500 includes vendor proprietary extensions that may be implemented for a specification communication protocol, for example a protocol of layer 510.

Layer 510 includes a plurality of supported and anticipated protocols. While other BASs systems may be able to communicate with a plurality of vendor devices using a plurality of protocols, the dynamic extensibility of ESE 20 in system 10 enables ESE 20 to automatically determine a vendor and appropriate protocol(s) or get support, even if a particular vendor was not originally included, without requiring recompilation and subsequent redistribution of the main program and system, or system reengineering. Variations of support within a protocol for a particular vendor panel also do not require recompilation. In one embodiment, support for such a variation may be limited to a base standard protocol support. BACnet™ 512, an implementation of the ASHRAE standard BACnet™ protocol, can include the 1998, 2001, and 2004 specifications in one embodiment, and can preferably also implement other and future specifications. BACnet™ 512 is part of protocol stack 118 and PDU 124 (refer to FIG. 3) and the implementation of panel and communications management 56 (refer to FIGS. 2 and 3). LON 514 includes the implementation of the industry standard LON protocol. LON 514 is part of protocol stack 118 and PDU 124, as well as panel and communications management 56. Protocol layers 516, 518, 520, 522, and 524 each can include implementations of various available, next-generation, proprietary, and/or emerging protocols. In one preferred embodiment, protocol layers 516, 518, 520, 522, and 524 can include supported proprietary protocols such as TRANE®'s COM4, COM3, next generation TNG/XML, and BMN, although other combinations and protocols can also be implemented. For example, one of protocol layers 516, 518, 520, 522, and 524 can include an implementation of an emerging protocol standard such as oBIX™, or Open Building Information Exchange. The oBIX™ standard is an industry-driven protocol initiative to define XML- and web-based systems and mechanisms for building control systems. Protocol layers 516, 518, 520, and 522 are part of protocol stack 118 and PDU 124 and the implementation of panel and communications management 56.

Kernel cache 526 is a caching layer for centralizing the management of input and output to panels 112 (FIGS. 3 and 4A; refer also, for example, to FIG. 4B), more particularly panel 40 of FIG. 1, for example. Kernel cache 526 is part of site manager 108 and site 110 and of site management 54.

A communications and communications extension manager layer 530 includes logic for managing and coordinating the various communications protocols of layer 510 described above. Communications and communications extension manger layer 530 is part of communication manager 116 and the implementation of panel management 56.

A metadata management layer 532 manages metadata definitions, which include definitions and rules for managing the various objects and properties of system 10 and ESE 20. Metadata management layer 532 includes metadata manager 114, objection definition 122, and property definition 128 and is part of the implementation of panel management 56.

An object management layer 534 manages in-memory objects and properties maintained by kernel 540, which is described below. Object management layer 534 includes data object 120 and smart value 126 and corresponds to object management 101 of FIG. 3.

A site management layer 536 manages all sites 110. As previously described, sites 110 can include buildings, campuses, structures, and other entities, such as individual HVAC networks. Site management layer 536 corresponds to site management 54 of FIGS. 2 and 3.

Direct communication interface 538 is a thin layer that provides direct access to lower-level communication services for higher-level applications. Direct communication interface 538 is part of site manager 108 and site 110 entities and is part of the implementation of site management 54.

In general, FIG. 3 depicts the core of data manager kernel layer 540. The kernel of system 10 and ESE 20 relies on object-oriented principles and functionality for a basic interface and framework of operability. Referring again to FIG. 5B, a data manager kernel layer 540 is used to describe and define the whole of the site, communications, object, and metadata components of system 10 and ESE 20. Kernel persistence manager layer 542 is responsible for handling persistence, or storage outside of memory, for the ESE 20 kernel. Kernel SQL interface 544 handles an interface to an SQL (structured query language) database for data manager kernel 540. A test manager 546 is responsible for managing registration of low-level kernel classes for testing purposes. While an SQL database is preferred in one embodiment of the invention, other database applications can also be used in other embodiments, such as MSDE (MICROSOFT® Data Engine) and the like, as recognized by those skilled in the art.

The ESE 20 kernel is designed to be extensible, and kernel extension manager 550 is responsible for managing, initializing, and shutting down each extension. Various extensions in one preferred embodiment of the invention include but are not limited to site synchronization 551, alarming 552, scheduling 553, data collection 554, kernel test harness 555, start-up 556, simulation 557, and graphical programming 558.

Site synchronization 551 is an extension layer responsible for services needed for site synchronization. Site synchronization is described in more detail below. Alarming 552 is an extension layer responsible for services needed for handling alarms for ESE 20. Scheduling 553 is an extension layer responsible for services for managing schedules for ESE 20. Data collection 553 is an extension layer responsible for services needed for collecting data, including trended data, for ESE 20. Kernel test harness 555 is an extension layer responsible for services needed for performing tests of the ESE 20 kernel functionality. Start-up 556 is an extension layer responsible for services needed for on-line discovery of an HVAC network for ESE 20. Simulation 557 is an extension layer responsible for services needed to run equipment simulator applications for ESE 20. Graphical programming 558 is an extension layer responsible for running graphical programming scripts for ESE 20.

Data manager web engine layer 562 brings ESE 20 to a web server to be used to support applications, such as HTML pages, built to run on web server 64. Data manager web engine layer 562 includes the implementation of data request manager 102 and data request object 104. Data manager persistence manager layer 563 manages persistence for applications built within data manager web engine 562 and is part of the implementation of application engine/framework 62. Data manager cache layer 564 manages data, including objects and properties, associated with web pages and is part of the implementation of the application engine/framework 62. Server-side test harness layer 565 is an extension layer responsible for services needed to perform tests of ESE 20 data manager server functionality. Data manager SQL interface layer 566 is responsible for handling the interface to a SQL database for the data manager of ESE 20. As previously mentioned, other database applications may be used in other embodiments of the invention, an SQL database indicative only of one embodiment of the invention. Accordingly, interface layer 566 can interface to other databases in other embodiments.

Web software framework layer 567 represents the framework used for building web applications for ESE 20 and is part of the implementation of application engine/framework 62. Applications layer 568 represents user interface 160 and applications 150 that make up ESE 20, including status, alarming, scheduling, data collection, security, administration, and the like. Client-side test harness layer 569 is responsible for performing client-side variation and verification of available tests.

Workstation software framework layer 570 represents the framework used for building non-web oriented applications 150. Workstation software persistence manager layer 572 manages persistence of applications 150 built as workstation software. Workstation software SQL interface layer 574 is responsible for handling the interface to a SQL database for workstation-based software. Similar to as mentioned above with reference to interface layer 566, interface layer 574 can also interface to other suitable database applications in other embodiments of the invention.

Simulator manager layer 575 is responsible for managing, starting, and stopping the services implemented in simulation kernel extension 557. Simulator user interface layer 576 is a user interface 160 for the simulator.

Unit test harness layer 577 is responsible for managing unit tests for each class and component within the kernel of ESE 20. Unit test harness user interface layer 578 is a user interface for running, viewing, and verifying results of unit tests.

Workstation software user interface framework layer 579 represents the framework for building workstation-based applications 150. Non-web applications layer 580 represents thick-client applications 150 to be built. Web user interface framework layer 581 is a framework that enables applications 150 built on web software framework 570 to operate on a single-user, i.e., non-web server based, machine. Applications 582 are a workstation re-use of applications 568.

With system 10 of FIG. 1 and architecture 500 of FIG. 5B as context, one preferred embodiment of ESE 20 is designed to be a self-modifying and self-adapting system integration engine, providing dynamic extensibility and scalability. Site management from the perspective of ESE 20 therefore includes the following primary system processes: system start-up; site discovery; site removal; site synchronization; and system shutdown. Each of these system processes will be described in more detail below.

Figure 6A:
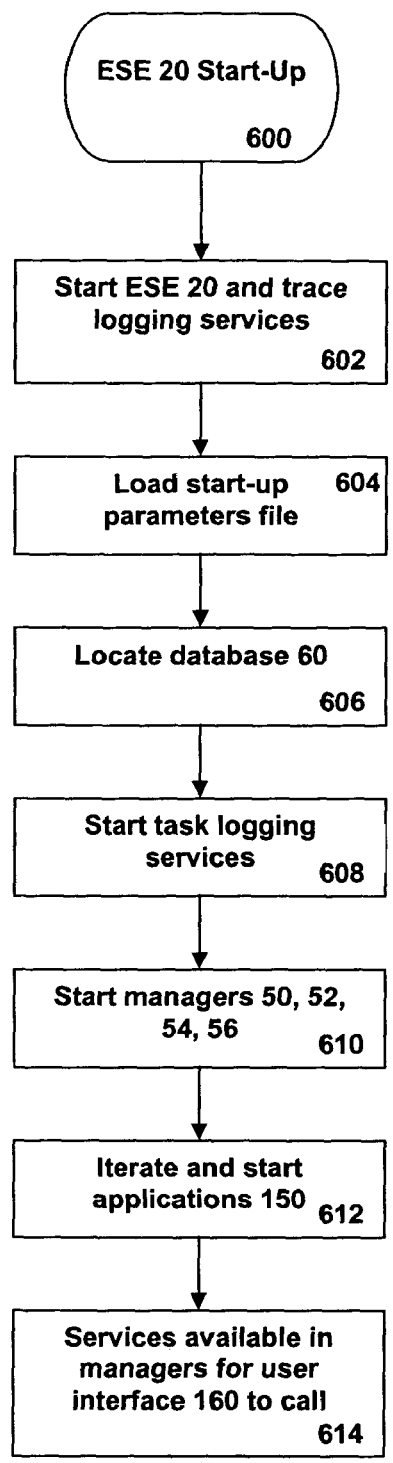
FIG. 6A is a start-up process flowchart according to one embodiment of the invention.
Figure 6B:
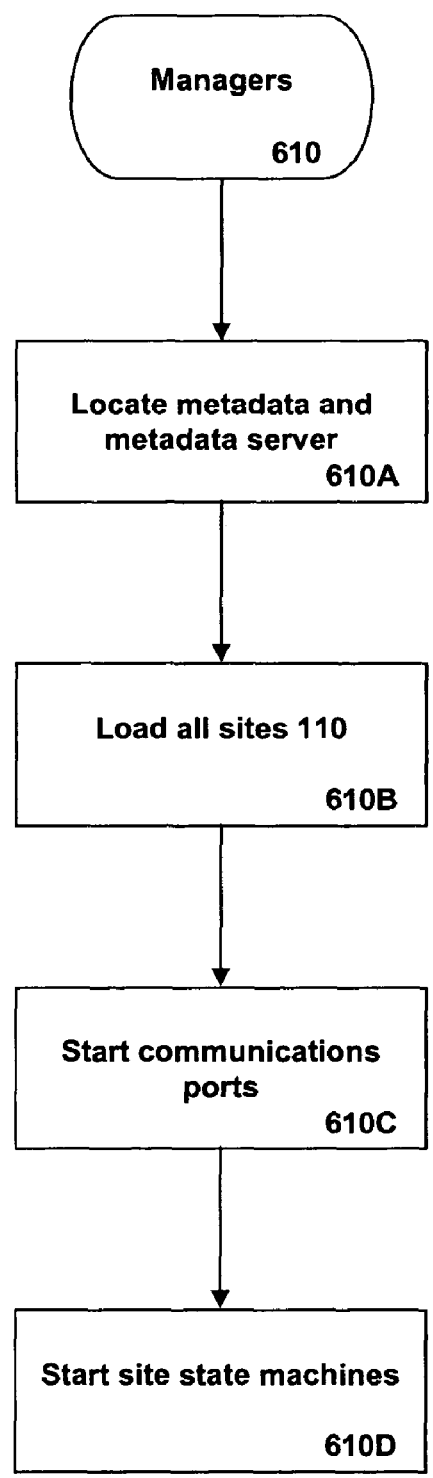
FIG. 6B is a data management sub-process flowchart according to one embodiment of the invention.

Referring to FIG. 6A, and recalling start-up extension 556 of FIG. 5B, an ESE start-up process 600 begins with starting ESE 20 and trace logging services, local to ESE 20, at step 602. Next, a start-up parameters file is loaded at step 604, and information from the start-up parameters file is used to locate database 60 at step 606. Task logging services are started at step 608, followed by managers 50, 52, 54, and 56 at step 610. In one embodiment, referring also to FIG. 6B, starting managers 50, 52, 54, and 56 at step 610 includes locating metadata and a metadata server at step 610A (meta-object management 50); loading all sites at step 610B (site management 54); starting communication ports at step 610C (panel and communications management 56); and starting site state machines at step 610D (site management 54), iterating over all sites known by ESE 20.

Referring again to FIG. 6A, step 612 includes iteration and start-up of all applications using the start-up parameters. Applications includes background task/service manager and application logging services; trending services; site synchronization services; site discovery services; alarming services, including enablement of incoming alarms; and scheduling services. Next, the system is synchronized and held until services are available at step 614. In one embodiment, ESE 20 start-up is held only until critical services, such as background task/service manager and application logging services, site synchronization services, and site discovery services, are available. In another embodiment, ESE 20 start-up is held at step 614 until all services are available. At step 616, and based on start-up parameters, user interface 160 services are started. After start-up, ESE 20 ready for normal operations and may execute other system processes.

In one embodiment, the aforementioned site 110 or object 120 integration into system 10 is accomplished via a discovery process. For example, a new panel 40 is installed at a location and is to be incorporated into system 10. ESE 20 operably executes one or more algorithms that discover the new object 112 (panel 40) within system 10 and subsequently analyze existing programming to first determine whether panel object 112 is in fact new, or whether panel object 112 was previously discovered within system 10. Upon determining that panel object 112 is a new addition, ESE 20 subsequently obtains any relevant or necessary information, such as vendor, version, and supported protocol(s), from and about panel object 112 in order for panel 40 to be integrated into system 10 and performs on-going reconfiguration.

Newly discovered panel 40/panel object 112 is also categorized for future addressing and identification. Object data and information, including categorization, is used to manage and control individual objects, groups of objects, and the entire system in use. In the discovery and categorization process, system 10 preferably applies recognized standards and rules, for example those promulgated by ASHRAE as previously discussed, where applicable and available. Exceptions may exist, however, if system 10 discovers a panel object 112 or object 120 from a common vendor, i.e., the same vendor or manufacturer as system 10, or from an outside vendor. These objects 112, 120 can be categorized and synchronized with system 10 according to that vendor's standards and rules, which in many cases will be the same or similar to those in the applicable industry, such as the aforementioned ASHRAE standards and rules.

In the case of an outside vendor object 112, 120 discovered, default metadata definitions for outside object 112, 120 BACnet™ implementation are used, including analogs, binaries, devices, schedules, and trends, among others. If, in a particular system 10, a mix of inside and outside vendor objects 112, 120 is found, site 110 in general is treated as an outside vendor site because the inside vendor equipment is likely not the main integration tool. In this situation, a panel 40 or supervisory controller 41 is used as the integration tool by ESE 20 to interface to the outside vendor equipment. In general, ESE 20 can also assume unless otherwise programmed that an object schedule mapped for ESE 20, whether inside or outside, will manage whatever it is respectively responsible for.

If newly discovered panel object 112 cannot be categorized or does not fit any existing category, panel object 112 can be automatically flagged or otherwise marked by system 10 for manual attention. In one embodiment in which such a situation occurs, no dialog is established between new panel 40 and ESE 20 until panel 40 can be categorized and associated definitions obtained, as panel 40 may be of a type that is not supported by system 10. While the BACnet™ protocol is used in some implementations and embodiments, LonTalk™ may be used in other implementations or embodiments. Additionally, both protocols, at different sites or at different system levels, may also be used within a single system 10. Each protocol preferably has its own separate virtual bus, but each runs TCP/IP in one embodiment over the same wire to appear as different networks. In other embodiments, MSTP (Master Slave Token Passing), MODBUS, PTP (Point-to-Point), and other BACnet™ and suitable protocols may also be used.

In one embodiment, panel objects 112 and objects 120 can be identified using various standard BACnet™ services. As in the initial discovery process, ESE 20 is preferably not dependent upon systems integration activities to program the specific configuration change data into system 10. If the data structures adhere to the standard data expected and recognized by ESE 20, the information is read from object 112, 120. Any specific context given to the information is also provided through input to ESE 20 without having to recompile and load another version of production code or field program the logic in system 10. In the absence of information for a specific panel 40 (panel object 112) for a manufacturer, system 10 reverts to the BACnet™ standard for the description of information in object 112, 120 and operates with this fundamental information in one embodiment.

For example, system 10 can identify an object 112, 120 according to a vendor in one embodiment. After vendor identification associated with object 112,120 is determined, system 10 can obtain more specific information related to object 120, including product, version, and definitions of how to communicate with that object 120. System 10 algorithm(s) can then be altered and synchronized to remember how to communicate with that object 112, 120 or other like objects having similar discovered characteristics in the future.

System 10 can alternatively determine an object's vendor by systematically running through available permutations or alternatively by assigning an Internet protocol (IP) address to panel object 112. Multiple options are available because response times may suffer while system 10 goes through each number or line of information. In one embodiment, a general description of the outside panel implementation of BACnet™ is provided to ESE 20 with an input file, i.e., panel metadata. ESE 20 can then discover a panel 40 at the described location, for example by the panel's IP address, and obtain any information relevant to the ESE 20 application to perform its operations, such as status and setpoints, data collection, alarming, and scheduling, with the panel. If an object 112, 120 cannot be identified according to the aforementioned and other methods, object 112, 120 is labelled an exception and system 10 implements an algorithm with which to treat the exception.

Figure 7:
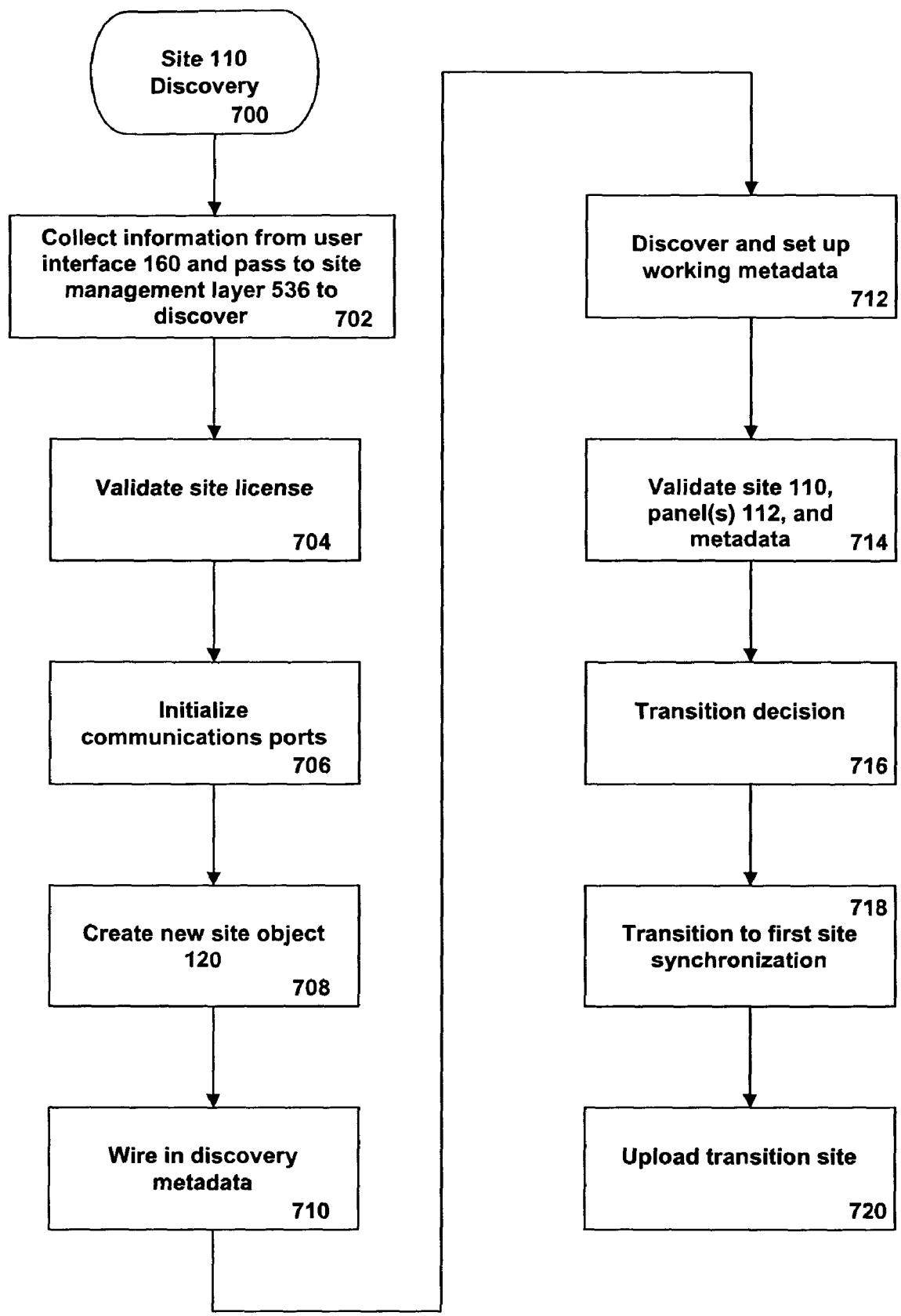
FIG. 7 is a site discovery process flowchart according to one embodiment of the invention.

Referring to FIG. 7, a site 110 discovery process 700 begins at step 702 with collecting site discovery information, such as from user input via a user interface or from a batch input file. The discovery information can include a site name, IP address/DNS name, port number to open, protocol to use, and a device identification (deviceID) to discover. The deviceID may be a system default in one embodiment. The discovery information is then passed to a site management layer 536.

At step 704, a site license is validated and includes verifying that a permitted number of site licenses will not be exceeded. If the site license cannot be validated at step 704 or if the number of site licenses is not successfully verified, an error message is returned at process 700 is stopped. If step 704 is successfully completed, communication ports are initialized at step 706. Step 706 includes requesting, from communication manager 56, a protocol stack for the port and protocol type. In one embodiment, ports are limited to one protocol per port; accordingly, ESE 20 will only attempt to discover one type of protocol 510 at a particular IP address. If the port is already used, ESE 20 determines whether the current port was opened using the requested protocol. If not, an error message is returned, discovery process 700 is stopped, and a protocol stack (if created) is deleted. If the port was opened using the requested protocol, a new protocol stack is created over the existing open socket and is initialized. Returning to the initial query, if ESE 20 determines that the port is not already in use, a new socket is opened and a new protocol stack is created and initialized. Based on the type of stack, basic initialization is then performed. If initialization is not successful for any reason, an error message is returned, process 700 is stopped, and a protocol stack, if created, is deleted.

If initialization was successful, a new site object 110 is created in memory and in database 60 at step 708. The new site object 110 is flagged as a "discovering" state, wherein no user actions are yet allowed on site 110 as a site object does not yet formally exist in system 10 outside of the site discovery status process.

Next, at step 710, discovery metadata is wired to the site. Discovery metadata is generic, with the protocol stack at this point deferring to a temporary entity that specifies and/or references the discovery metadata and the default set of services to use. Working, or actual, metadata is discovered, wired in, and set-up at step 712 after getting a list of one or more panels 40 from the protocol stack. This step is dependent in part upon the type of protocol 510 and the results of previous steps and can vary according to inside vs. outside panels 40, including previous discovery and an available device list from a site layout object and a general broadcast algorithm to request responses from objects 112, 120. Iterating for each device 40, low-level communications bindings/tables are set up for panel 40, including IP address, MAC address, deviceID, and the like. If a metadata version for panel 40 is found, appropriate metadata for panel 40 is wired in, a list of supported services is read from panel 40, and panel object 112 is created. Panel object creation also includes setting all internal values and storing in database 60. If a metadata version for panel 40 is not found, the panel state is set to "not available," requiring user attention to resolve. After iterating for each device found, a site state is set to an "okay to synchronize" state.

At step 714, site 110, panels 40 (112), and metadata are validated. Validation initially includes verifying that supporting metadata for each panel 40 is available to enable the communication manager 56 and data management 52 services to properly operate, and determining whether a sufficient number of panels 40 are supported. In one embodiment, this second aspect of validation is successful if only one working panel 40 is found. In other embodiments, more working panels 40 are required. If validation is not successful, discovery process 700 fails and a protocol stack, if created, is deleted.

If validation is successful, a transition decision occurs at step 716, wherein if communications with at least one panel 40 at site 110 can be established at a high enough level, discovery 700 continues. Transition decision 716 is followed by a first site synchronization at step 718. Upon successful completion of the first site synchronization, site 110 is transitioned to an operational state and incoming alarming and trending notifications are allowed at upload transition site step 720.

Figure 8:
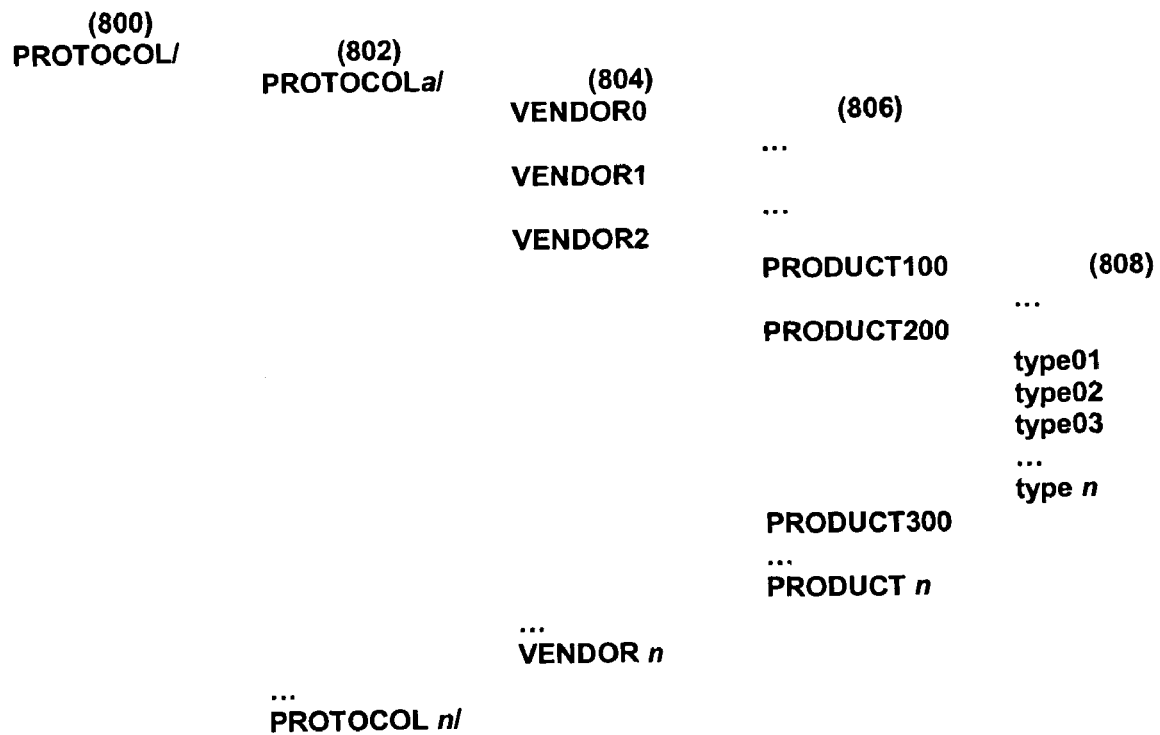
FIG. 8 is a dynamic protocol support diagram according to one embodiment of the invention.

With respect to establishing communications with at least one panel at a sufficient or high enough level, ESE 20 operably provides dynamic protocol support. Referring to FIG. 8, a representative and example dynamic protocol support algorithm table 800 illustrates various "levels" of identification and communication that can be established with a panel 40 or other object in system 10. For example, protocol support table 800 includes at least one available protocol 804, or PROTOCOLa/ in FIG. 8. PROTOCOLa/ may be a BACnet™ protocol or another suitable protocol as previously described. PROTOCOLa/ then more specifically includes at least one vendor 806. VENDOR0 may be a default vendor, VENDOR1 may be ASHRAE, VENDOR2 may be TRANE®, and so on, these particularly vendors used only for one example. At least one product 808 may then be associated with each vendor 806, and each product 808 may include at least one type or version 810. When establishing communications with a panel 40, then, ESE 20 preferably obtains metadata to identify panel 40 as specifically as possible to establish higher level communications. If ESE 20 is able to identify a first panel 40 to a vendor level 806 and second panel 40 to a type level 810, for example, ESE 20 will be able to establish higher level communications with second panel 40 because ESE 20 will have more detailed and specific information.

System 10 further operates, by way of example, as an infinite state machine. Current embedded systems are state machines with a finite number of operating states. An infinite state machine, however, can provide so-called "plug-and-play" operability by discovering a panel object 40, synchronizing panel object 40, recompiling ESE 20 for integration or re-integration, and changing state while running. For a system integration platform as in system 10 having an infinite number of states, each state of system 10 must be discovered and anticipated, in contrast to a danger/safe system in which the system must know all possible states and potentially be reengineered to recognize additional or updated states.

ESE 20 comprises a plurality of background administrative state machines that keep ESE 20 operational and up-to-date. These state machines, and each implementation of ESE 20 generally, vary from site to site. In one embodiment, ESE 20 provides an intuitive interface for device set-up parameters, including but not limited to an IP address, subnet mask, gateway, and server name, and provides means for setting up, customizing, and publishing both template and individual web pages. For either templates or individual pages, ESE 20 can present dynamically generated content as the pages are served. ESE 20 further provides an interface to make administrative functions available through a web browser for configuration of system 10 and applications. Functions and applications that may require administrative configuration include site management, customization, user security, alarms, scheduling, trending, and the like, and can vary according to an object, panel, building, or other component or characteristic of system 10.

ESE 20 is preferably not dependent upon systems integration activities to program specific data into system 10, in contrast with current methods of field programming. If panel 40 data structures adhere to the applicable standard data recognized by ESE 20, the information can be automatically read from panel 40. Applicable standards in various embodiments include those defined in ASHRAE 135-2004 or future standard protocols such as OBIX™, as well as others. Any specific context given to the information, such as that created by the panel vendor/manufacturer, can be provided through input to ESE 20. This eliminates the need to recompile and load subsequent versions of production code or have a field organization program the logic in system 10.

Additionally, ESE 20 can detect configuration changes after initial panel 40 discovery (700) and automatically adjust to the detected changes. In one embodiment, this is accomplished by identifying all of the objects 120 on each panel 112 and then performing a synchronizing process periodically after initial discovery as previously described.

The synchronizing process preferably runs on a configurable timer in one embodiment. System 10 compares a version running with detected building or location activity. If any synchronization is needed, system 10 next determines whether the synchronization can be handled via an available algorithm. If yes, system 10 proceeds to execute the algorithm. If no, system 10 can send a request for manual service.

Synchronization can be automatic, scheduled, or forced in one embodiment. System 10 can automatically discover and synchronize a new panel object 112, as described above. System-wide synchronization can also be periodically scheduled, such as at midnight each day or at some other time or interval. Synchronization can also be forced on-demand. User interface 160 can include a "synchronize now" feature by which a user can selectively synchronize system 10 on demand. This feature can be particularly useful in situations in which service has been performed, such as in response to a comfort complaint or for some other purpose, and system 10 can be subsequently synchronized close-in-time to quickly incorporate the update(s).

Figure 9:
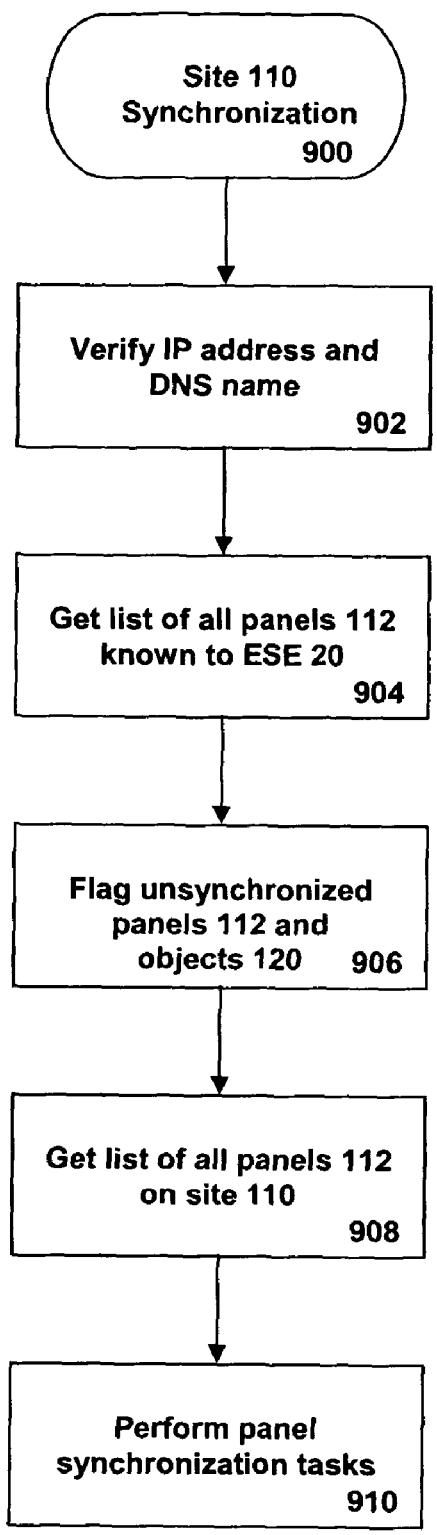
FIG. 9 is a site synchronization process flowchart according to one embodiment of the invention.

Referring to FIG. 9, a site synchronization process 900 can be triggered or initiated by several different events, including a site addition, a recurring schedule, and a user-initiated "synchronize now" event. Process 900 is followed for each site 110 and begins at step 902 by verifying that the IP address/DNS name for site 110 has not changed. If the address or name have changed, do not match, or otherwise conflict, site 110 is flagged and logged.

Next, a list of all panels 40 known to ESE 20, and having verified IP addresses and DNS names, is obtained at step 904 as a list of panels 40 to be synchronized. Panels 40 that have already been synchronized or those that are not in a proper operating state are identified and skipped in the subsequent synchronization steps; remaining panels 40 are flagged as unsynchronized and all associated objects are also flagged as not synchronized at step 906. At step 908, a list of all panels 40 "on the wire" is obtained for site 110.

Figure 10A:
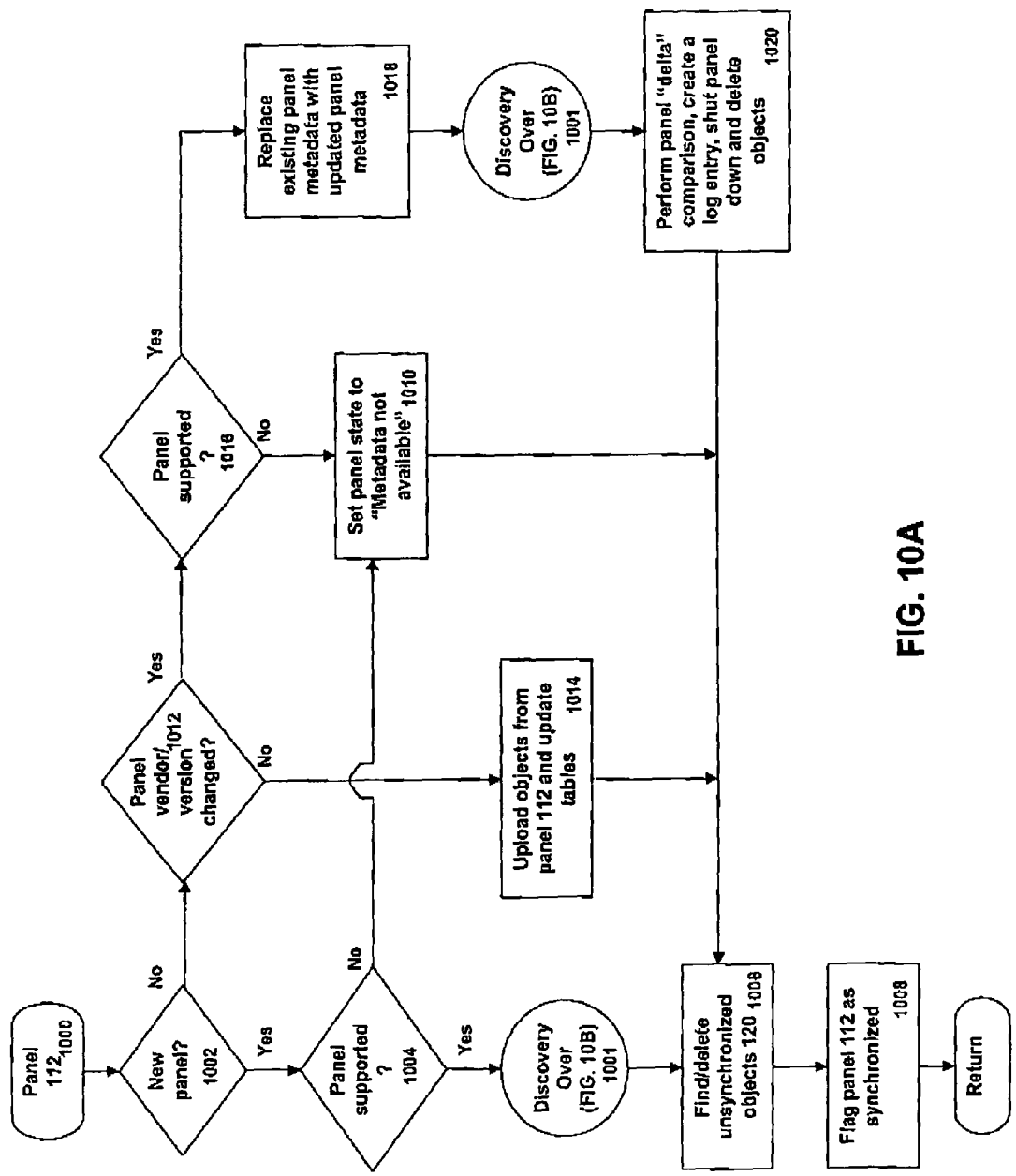
FIG. 10A is a site synchronization process flowchart according to one embodiment of the invention.
Figure 10B:
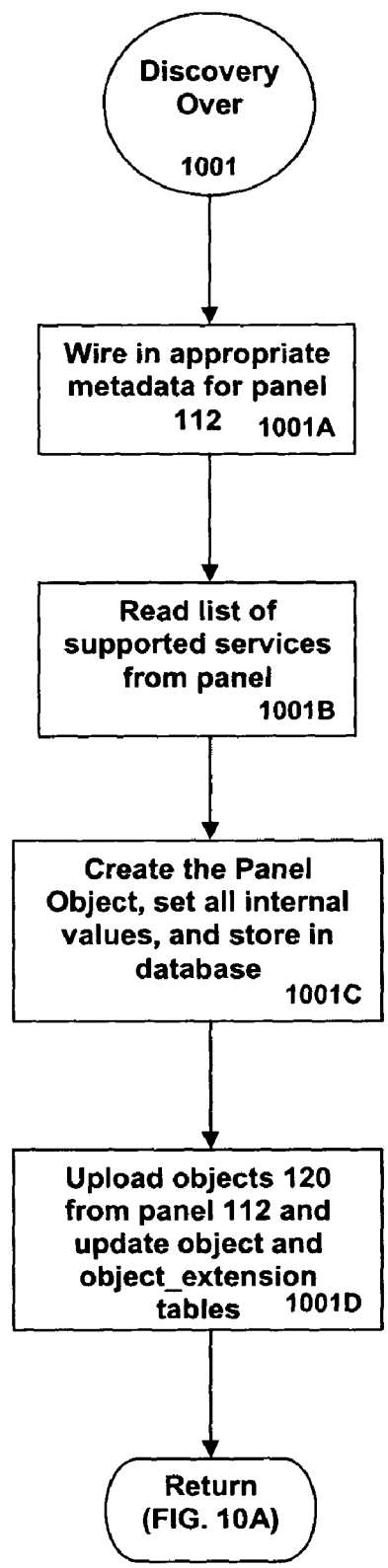
FIG. 10B is a site synchronization sub-process flowchart according to one embodiment of the invention.

For each panel 40 on the wire, panel synchronization tasks are then performed at step 910. Referring to FIG. 10A, step 1002 is determining whether panel 40 is new. If panel 40 is new, step 1004 is determining whether panel 40 is supported, i.e., is metadata available. If yes, sub-process 1001 is implemented: appropriate metadata for panel 40 is wired in; the list of supported services for panel 40 is read; panel object 112 is created, and internal values are set and stored in the database; and objects 120 are uploaded from panel 40 and appropriate tables are updated. At step 1006, any unsynchronized objects are deleted and the synchronized panel is labelled as such and updated with the latest synchronization date/time at step 1008.

Returning to step 1004, if panel 40 is not supported, the panel state is set to "metadata not available" at step 1010 and panel process 1000 returns to step 1006. Returning to step 1002, if panel 40 is not new and, at step 1012, the vendor or version of panel 40 has not changed, objects 120 are uploaded from panel 40 and tables are updated at step 1014 before returning to step 1006. If the panel 40 vendor or version is found to have changed at step 1012, step 1016 determines whether panel 40 is supported. If panel 40 is not supported, process 1000 advances to step 1010. If panel 40 is supported, panel process 1000 advances to step 1018, wherein existing panel information (metadata) is replaced with new or updated information. In one embodiment, this is accomplished by making a copy of a row in a panel table and any associated rows in object and object_extension tables. Panel Process 1000 subsequently advances to sub-process 1001. Process 1001 can include wiring in appropriate metadata for panel 112 at step 1001A, reading the list of supported services from panel at step 1001B, creating the Panel Object, setting all internal values, and storing in the database at step 1001C, and uploading objects 120 from panel 112 and updating object and object extension tables at step 1001D. Panel Process 1000 can then, at step 1020, perform a panel "delta" comparison, create a log entry, shut panel down and delete objects. In panel process 1000 to determine whether a panel is new, has changed, is supported, and the like, sub-processes similar to discovery process 700, in particular steps 706-716, are generally used in communications between ESE 20 and panel(s) 40.

Object or panel removal from system 10 is typically more complex than object addition through discovery process 700 as previously described. For example, interdependencies related to the object to be removed must be resolved or corrected. Further, system 10 generally cannot automatically recognize an object removal in the same way a new object can be discovered because an object removal can appear to be a fault or error related to the object, indistinguishable from a legitimate removal. Accordingly, object removals may require manual service or updating to accomplish.

Figure 11:
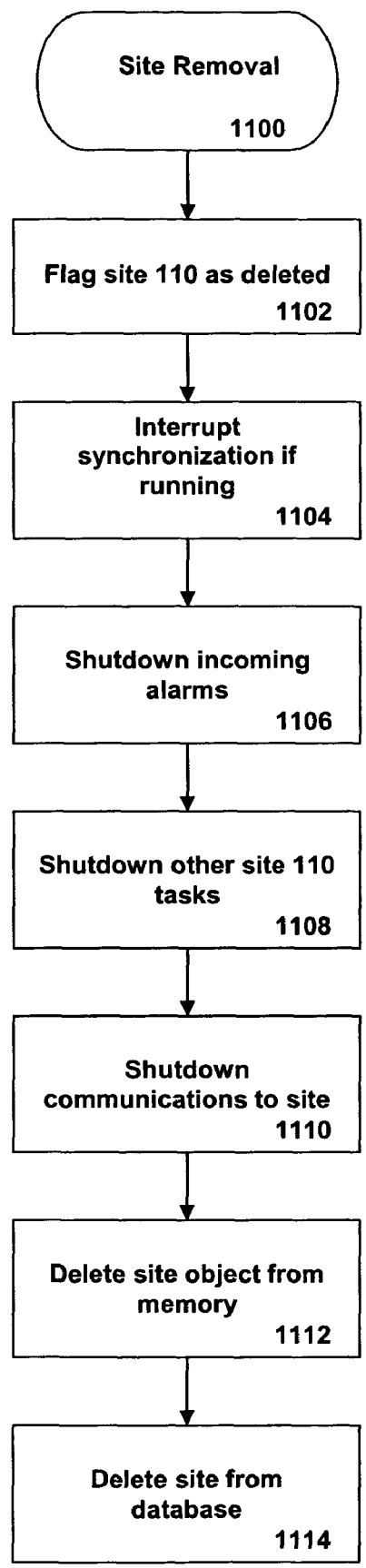
FIG. 11 is a site removal process flowchart according to one embodiment of the invention.

Referring to FIG. 11, a site removal process 1100 begins with flagging a site 110 as deleted at step 1102. Synchronization is interrupted if running at step 1104, and incoming alarms are shutdown at step 1106. Other site 110 tasks are shut down at step 1108, and communications to site 110 are subsequently shut down at step 1110. The site object is deleted from memory at step 1112, and, at step 1114, site 110 is deleted from database 50.

In use, ESE 20 and system 10 provide summary tables by equipment type or some other attribute, per site. The summary tables are preferably based upon system- or user-defined attributes, wherein user-defined attributes are the most intuitive for management from a user perspective. Some attributes, however, may be system-defined, such as a system identifier, an object type, and the like. In one embodiment, summary tables include site and object names or other identifiers, space temperatures, setpoints, and diagnostic status.

Another aspect of one embodiment of ESE 20 and system 10 of the invention is related to alarming. System 10 and various objects therein will, by their very function and purpose, occasionally or systematically generate alarms. The alarms may be related to an operating state of the object, a service need status, a detected object or system characteristic, or some other indicator or condition. ESE 20 operably receives alarms from objects and, according to the invention, triages, manages, or otherwise appropriately handles the alarms. ESE 20 can also store or archive alarms and display an alarm log for a user.

In one embodiment, relevant to alarm triage, ESE 20 can automatically analyze an alarm to notify and/or request service or otherwise ensure that the alarm will receive the attention it warrants. Alarm triage, sorting, and filtering can be provided based upon an alarm and/or site attribute. By way of example, it can be appreciated that an alarm related to a particular area or object within a facility can a much greater significance than an alarm related to another area within the same facility. Similarly, one type of alarm may require a more rapid response than another type of alarm. Therefore, ESE 20 can automatically assess an incoming alarm according to an alarm type, source, and/or relevant object attribute and then handle the alarm appropriately. For example, ESE 20 can forward a higher priority alarm via email after ascertaining the relative importance of the alarm indicator. Within system 10, alarm forwarding via email is set up through a web browser user interface as an administrative function, enabling a user to specify to whom or what the notification should be sent. ESE 20 can also simply catalog lower priority alarms for later review by a user in a viewable alarm log. In larger implementations of system 10, ESE 20 can maintain more than one alarm log and can catalog or archive alarms in an appropriate log. A user can then review the alarms and acknowledge or delete the alarms as desired. ESE 20 can also automatically and periodically purge the alarm log(s) as needed or as defined by a user or administrator of system 10.

In one embodiment, alarms are preferably received and handled by ESE 20 in real time. In another embodiment, such as one incorporating legacy panels and devices, ESE 20 optionally collects alarms from objects on a periodic basis, such as hourly, daily, or more or less frequently. ESE 20 can also determine a common source of multiple alarms or a trigger of a repeated alarm. single fault within or peripheral to system 10 can trigger multiple alarms, and identifying the single fault first rather than attending to each individual alarm is a much more efficient to clear system 10 and return to a standard operating state.

In addition to automatically handling and triaging alarms, system 10 and more particularly ESE 20 can trend alarms and other data. Trending within system 10 is an intuitive and efficient management and diagnostic tool. In one embodiment, trend data is collected by ESE 20 from one or more objects 40, 42, 44, and/or 46 at a maximum frequency of once per minute or at another lower frequency or on a specific scheduled basis as defined by a user or administrator. Trend data can then be stored in a database and, in one embodiment, is available for sharing with network peers.

A further benefit provided by ESE 20 and system 10 of the invention is an automatic maintenance application. The automatic maintenance application may relate to updates, upgrades, and other regular or semi-regular tasks. In general, three types of updates will most frequently apply to system 10: simple updates; manageable updates; and complex updates.

Simple updates include minor changes and/or module additions to system 10. Simple updates can typically be implemented "on-the-fly" without bringing down any other applications or services provided and/or managed by system 10.

Manageable updates can include simple updates but may also require a service to be paused or memory caches flushed in order to apply the necessary or desired change. Unlike simple updates, manageable updates generally require system user notification because of the service interruption. In some circumstances, simple updates may become manageable updates, or even complex updates as described below, because of consequential operations of the system and circumstances that develop during the update process.

Complex updates will generally require that servers and systems be brought down to accomplish the update. Complex updates may also or alternatively require that servers be restarted upon installation of the update. Updates to ESE 20, database changes, and other major updates are all included in complex updates. Additionally, simple and manageable updates may become complex updates because of unintended circumstances and events that occur during the update process.

In one embodiment, there is no distinction between a manageable update and a complex update from a user perspective, as each is implemented in the same manner and requires that servers and systems be brought down.

System 10 is therefore an object-oriented system designed with algorithms that work with self-describing panels 40 or objects. System 10 algorithms communicate with objects to determine whether the objects are operating with algorithms by which they can be identified and integrated. If system 10 cannot determine whether an object is operating with an algorithm, system 10 intelligently and automatically defines the object as an exception. System 10 is universally self-describing in that system 10 applies concepts and captures algorithms based on object self-descriptions. The algorithms are then translated to accomplish associated mechanical aspects of the objects and system 10.

The present invention further provides the ability to alter definitions of objects in ESE 20 without having to recompile the production code. This provides for ease of maintenance and product support. Altered or updated definitions can then be input files to ESE 20, and complete or more complex updates can be made separately. Contrast this update process of the present invention with current methods, in which in order to get an update to object definitions to the end user or customer, production code needs to be rebuilt, tested, and updated for an installation. This increases the amount of time required by an on-site technician and the risk of failed installations.

The invention may be embodied in other specific forms without departing from the spirit of the essential attributes thereof; therefore the illustrated embodiment should be considered in all respects as illustrative and not restrictive, reference being made to the appended claims rather than to the foregoing description to indicate the scope of the invention.

What is claimed is:

1. A building automation system (BAS) comprising:
   a system architecture of a building site comprising a communication network compatible with a plurality of communication protocols and having a dynamic extensibility capability and an automatic configuration capability;
   a server engine communicatively coupled to the communication network and compatible with at least a portion of the plurality of communication protocols; and
   at least one building subsystem control device communicatively coupled to the communication network, wherein the control device is known or unknown to the server engine, and wherein a known building subsystem control device comprises a portion of the system architecture;
   wherein the server engine includes:
      software instructions configured to implement the dynamic extensibility capability such that the server engine capability is extended to establish communications with and to control both known and unknown building subsystem control devices through the communication network, wherein the dynamic extensibility capability includes a proprietary extension layer which comprises a protocol stack configured to support the plurality of communication protocols,
      software instructions configured to implement the automatic configuration capability such that the server engine receives at least one characteristic from both known and unknown building subsystem control devices such that the automatic configuration capability determines if the at least one building subsystem control device is known or unknown to the server engine, and
      software instructions configured to expand the architecture to include in the proprietary extension layer at least one characteristic of a known building subsystem control device that was previously unknown to the server engine after implementation of the dynamic extensibility capability and the automatic configuration capability.

2. The BAS of claim 1, wherein the at least one characteristic is selected from a group consisting of a communication protocol, a communication protocol version, a vendor, a product, a type, and a version.

3. The BAS of claim 1, wherein the server engine further comprises software instructions such that the server engine is configured to store the characteristic as a definition in a program utilized by the server engine.

4. The BAS of claim 3, wherein the server engine need not recompile the program after storing the definition.

5. The BAS of claim 3, further comprising a database communicatively coupled to the communication network and operably controlled by the server engine, wherein the program is stored in the database.

6. The BAS of claim 1, wherein the server engine comprises a generally compatible communication protocol to establish communications with known and unknown building subsystem control devices through the communication network.

7. The BAS of claim 1, wherein a first building subsystem control device is compatible with a first communication protocol, wherein a second building subsystem control device is compatible with a second communication protocol different from the first communication protocol compatibility, and wherein the plurality of communication protocols comprise the first and second communication protocols.

8. The BAS of claim 7, wherein the first and second communication protocols differ by a communication standard, a version, or any combination thereof.

9. The BAS of claim 8, wherein the server engine further comprises software instructions such that the server engine is configured to concurrently implement both the first and second protocols.

10. The BAS of claim 1, wherein the communication network comprises an Intranet network, an Internet network, or any combination thereof.

11. The BAS of claim 10, wherein the server engine comprises a single address and the building subsystem control device comprises a network address.

12. The BAS of claim 11, wherein the server engine discovers the network address of the building subsystem control device according to the dynamic extensibility capability.

13. The BAS of claim 10, wherein the network address of the building subsystem control device is manually programmed.

14. A building automation system (BAS) comprising:
a system architecture of a building site comprising a communication network compatible with a plurality of communication protocols and having a dynamic extensibility capability and an automatic configuration capability;
a server engine communicatively coupled to the communication network and compatible with at least a portion of the plurality of communication protocols; and
at least one building subsystem control device communicatively coupled to the communication network, wherein the building subsystem control device is known or unknown to the server engine, and wherein a known building subsystem control device comprises a portion of the system architecture;
wherein the server engine includes
means for dynamically extending the capability of the server engine to establish communications with and to control both known and unknown building subsystem control devices through the communication network,
means for automatic configuring of the server engine with a capability to determine at least one characteristic of both known and unknown building subsystem control devices communicatively coupled to the communication network, and
mean for expanding the architecture to include a known building subsystem control device that was previously unknown after implementation of the dynamic extensibility capability and the automatic configuration capability.

15. The BAS of claim 14, wherein the at least one characteristic is selected from a group consisting of a communication protocol, a communication protocol version, a vendor, a product, a type, and a version.

16. The BAS of claim 14, wherein the server engine further comprises software means for storing the characteristic as a definition in a program utilized by the server engine.

17. The BAS of claim 16, wherein the server engine need not recompile the program after storing the definition.

18. The BAS of claim 16, further comprising a database communicatively coupled to the communication network and operably controlled by the server engine, wherein the program is stored in the database.

19. The BAS of claim 16, wherein the means for dynamically extending the capability of the server engine comprises a means for integrating an unknown control device into the architecture as a known control device by adding or altering a definition in the program.

20. The BAS of claim 14, wherein the server engine comprises a means for communicating with a generally compatible communication protocol to establish communications with known and unknown building subsystem control devices.

21. The BAS of claim 14, wherein a first building subsystem control device is compatible with a first communication protocol, wherein a second building subsystem control device is compatible with a second communication protocol different from the first communication protocol compatibility, and wherein the plurality of communication protocols comprise the first and second communication protocols.

22. The BAS of claim 21, wherein the first and second communication protocols differ by a communication standard, a version, or any combination thereof.

23. The BAS of claim 22, wherein the server engine further comprises means for concurrently communicating over the first communication protocol with the first building subsystem control device and the second communication protocol with the second building subsystem control device.

24. The BAS of claim 14, wherein the communication network comprises an Intranet network, an Internet network, or any combination thereof.

25. The BAS of claim 24, wherein the server engine comprises a single address on the communication network and the building subsystem control device comprises a network address on the communication network.

26. The BAS of claim 25, wherein the means for dynamically extending the capability of the server engine further comprises a means for discovering the network address of the building subsystem control device on the communication network.

27. The BAS of claim 25, wherein the network address of the building subsystem control device is manually programmed.

* * * * *